United States Patent
Cao et al.

(10) Patent No.: US 12,471,068 B2
(45) Date of Patent: Nov. 11, 2025

(54) RANDOM ACCESS CHANNEL OCCASION CONFIGURATION

(71) Applicant: Qualcomm Incorporated, San Diego, CA (US)

(72) Inventors: Yiqing Cao, Beijing (CN); Wanshi Chen, San Diego, CA (US); Jing Lei, San Diego, CA (US); Joseph Binamira Soriaga, San Diego, CA (US); Peter Gaal, San Diego, CA (US); Juan Montojo, San Diego, CA (US); Ruiming Zheng, Beijing (CN); Peng Cheng, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 988 days.

(21) Appl. No.: 17/431,688

(22) PCT Filed: Feb. 21, 2020

(86) PCT No.: PCT/CN2020/076103
§ 371 (c)(1),
(2) Date: Aug. 17, 2021

(87) PCT Pub. No.: WO2020/169074
PCT Pub. Date: Aug. 27, 2020

(65) Prior Publication Data
US 2022/0141879 A1     May 5, 2022

(30) Foreign Application Priority Data
Feb. 22, 2019 (WO) ................ PCT/CN2019/075817

(51) Int. Cl.
*H04W 72/044* (2023.01)
*H04W 72/0446* (2023.01)
(Continued)

(52) U.S. Cl.
CPC ....... *H04W 72/044* (2013.01); *H04W 74/002* (2013.01); *H04W 74/0836* (2024.01); *H04W 74/0833* (2013.01)

(58) Field of Classification Search
CPC ......... H04W 74/0833; H04W 74/0836; H04W 72/044; H04W 74/002
See application file for complete search history.

(56) References Cited

U.S. PATENT DOCUMENTS

| 11,206,693 B2 * | 12/2021 | Xiong | ................. H04W 74/002 |
| 2010/0215013 A1 * | 8/2010 | Chun | ................. H04W 74/002 370/329 |

(Continued)

FOREIGN PATENT DOCUMENTS

| CN | 108271275 A | 7/2018 | |
| KR | 101720529 B1 * | 4/2017 | ............... H04B 7/26 |

(Continued)

OTHER PUBLICATIONS

International Search Report and Written Opinion—PCT/CN2020/076103—ISA/EPO—May 20, 2020.

(Continued)

*Primary Examiner* — Jenee Holland
(74) *Attorney, Agent, or Firm* — Holland & Hart LLP/Qualcomm

(57) ABSTRACT

Methods, systems, and devices for wireless communication are described. Generally, the described techniques provide for efficiently transmitting data and control information in a first RACH message to a base station as part of a two-step RACH procedure. In particular, rather than or in addition to transmitting data and control information in a physical uplink shared channel (PUSCH) in the first RACH message, a user equipment (UE) may transmit the data and control information along with a RACH preamble in a RACH occasion in the first RACH message (e.g., when the number (Continued)

of bytes of data or control information to be transmitted is low). Using these techniques, in some instances, the UE may transmit the data and control information in a first RACH message without transmitting the PUSCH, and the overhead associated with transmitting the PUSCH may be eliminated.

28 Claims, 14 Drawing Sheets

(51) Int. Cl.
*H04W 72/0453* (2023.01)
*H04W 72/1268* (2023.01)
*H04W 72/20* (2023.01)
*H04W 72/21* (2023.01)
*H04W 72/23* (2023.01)
*H04W 74/00* (2009.01)
*H04W 74/0833* (2024.01)
*H04W 74/0836* (2024.01)

(56) References Cited

U.S. PATENT DOCUMENTS

| | | | | |
|---|---|---|---|---|
| 2015/0092676 | A1* | 4/2015 | Periyalwar | H04W 76/15 370/329 |
| 2018/0124822 | A1 | 5/2018 | Wang et al. | |
| 2018/0279376 | A1* | 9/2018 | Dinan | H04W 74/0833 |
| 2019/0053272 | A1 | 2/2019 | Tsai | |
| 2019/0059112 | A1* | 2/2019 | Ou | H04W 74/0833 |
| 2019/0116613 | A1* | 4/2019 | Abedini | H04W 74/0833 |
| 2019/0132882 | A1* | 5/2019 | Li | H04L 27/2605 |
| 2019/0313449 | A1* | 10/2019 | Tsai | H04W 72/1268 |
| 2020/0045742 | A1 | 2/2020 | Suzuki et al. | |
| 2020/0100297 | A1* | 3/2020 | Agiwal | H04W 52/365 |
| 2020/0146069 | A1* | 5/2020 | Chen | H04W 76/18 |
| 2020/0214044 | A1* | 7/2020 | Qian | H04W 52/325 |
| 2020/0236716 | A1* | 7/2020 | Lei | H04L 5/0044 |
| 2020/0404711 | A1 | 12/2020 | Zhao et al. | |
| 2021/0014011 | A1* | 1/2021 | Xiong | H04L 1/1887 |
| 2021/0037576 | A1* | 2/2021 | Shao | H04L 5/0051 |
| 2022/0053571 | A1* | 2/2022 | Lee | H04W 74/0866 |
| 2022/0070943 | A1* | 3/2022 | Xu | H04W 24/08 |
| 2022/0287108 | A1* | 9/2022 | Takahashi | H04W 52/367 |
| 2024/0172092 | A1* | 5/2024 | Fujishiro | H04W 48/08 |

FOREIGN PATENT DOCUMENTS

| | | |
|---|---|---|
| WO | WO-2018085428 A1 | 5/2018 |
| WO | WO-2018135631 A1 | 7/2018 |
| WO | WO-2018171802 A1 | 9/2018 |
| WO | WO-2019029676 A1 | 2/2019 |

OTHER PUBLICATIONS

International Search Report and Written Opinion—PCT/CN2019/075817—ISA/EPO—Nov. 13, 2019.
Taiwan Search Report—109105690—TIPO—Sep. 14, 2023.
Interdigital Communications: "2-step Random Access Procedure", 3GPP Draft, R1-1700703, 3rd Generation Partnership Project (3GPP), Mobile Competence Centre, 650, Route Des Lucioles, F-06921 Sophia-Antipolis Cedex, France, vol. RAN WG1, No. Spokane, USA, Jan. 16, 2017-Jan. 20, 2017, Jan. 10, 2017 (Jan. 10, 2017), XP051203022, 4 pages, Section 2.
Qualcomm Incorporated: "Procedures for Two-Step RACH", 3GPP Draft, 3GPP TSG-RAN WG1 Meeting #96, R1-1902978, Procedures for Two-Step RACH, 3rd Generation Partnership Project (3GPP), Mobile Competence Centre, 650, Route Des Lucioles, F-06921, Sophia-Antipolis Cedex, France, vol. RAN WG1, No. Athens, Greece, Feb. 25, 2019-Mar. 1, 2019, Feb. 16, 2019 (Feb. 16, 2019), XP051600675, 9 Pages, section 2, section 3, section 5.
Sierra Wireless: "Channel Structure for Two-Step RACH Considerations", 3GPP TSG RAN WG1 #96, R1-1902133, vol. RAN WG1, No. Athens, Greece, Feb. 15, 2019, XP051599828, 5 Pages.
Supplementary European Search Report—EP20758817—Search Authority—The Hague—Oct. 10, 2022.
NOKIA., et al., "On 2-step RACH Channel Structure", R1-1902135, 3GPP Feb. 15, 2019, 3GPP TSG-RAN WG1 Meeting #96, Feb. 25-Mar. 1, 2019, pp. 1-8.
Taiwan Search Report—TW109105690—TIPO—Mar. 7, 2023.
INTERDIGITAL: "2-Step RACH Procedure", R2-1814008, 3GPP TSG-RAN WG2 Meeting # 103bis, Chengdu, China, Oct. 8-12, 2018, pp. 1-5.

* cited by examiner

RANDOM ACCESS CHANNEL OCCASION CONFIGURATION

CROSS REFERENCE TO RELATED APPLICATIONS

The present application for patent claims priority to International Patent Application No. PCT/CN2020/076103 by CAO et. al., entitled "RANDOM ACCESS CHANNEL OCCASION CONFIGURATION," filed Feb. 21, 2020, and to International Patent Application No. PCT/CN2019/075817 by CAO et. al., entitled "RANDOM ACCESS CHANNEL OCCASION CONFIGURATION," filed Feb. 22, 2019, each of which is assigned to the assignee hereof, and each of which is expressly incorporated by reference in its entirety herein.

BACKGROUND

The following relates generally to wireless communications and more specifically to random access channel (RACH) occasion configuration.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, a UE may use a two-step random-access procedure to establish a connection with a base station and/or identify suitable parameters and configurations for communicating with the base station. The two-step RACH procedure may include a transmission of a first RACH message from a UE to a base station and a transmission of a second RACH message from the base station to the UE (e.g., confirming reception of the first RACH message). In some cases, as part of a two-step RACH procedure, it may be appropriate for a UE to transmit data or control information to a base station. The data or control information may include a radio resource control (RRC) setup request, an RRC reestablishment request, an RRC resume request, an RRC system information request, or a cell radio network temporary identifier (C-RNTI). Conventional techniques for transmitting data or control information to a base station as part of a two-step RACH procedure may be deficient.

SUMMARY

The described techniques relate to improved methods, systems, devices, and apparatuses that support random-access channel (RACH) occasion configuration. Generally, the described techniques provide for efficiently transmitting data and control information in a first RACH message to a base station as part of a two-step RACH procedure. In particular, rather than or in addition to transmitting data and control information in a physical uplink shared channel (PUSCH) in the first RACH message, a user equipment (UE) may transmit the data and control information along with a RACH preamble in a RACH occasion in the first RACH message (e.g., when the number of bytes of data and control information to be transmitted is low). Using these techniques, in some instances, the UE may transmit the data and control information in a first RACH message without transmitting the PUSCH, and the overhead associated with transmitting the PUSCH may be eliminated (e.g., cyclic redundancy check (CRC) overhead, channel coding overhead, higher layer header overhead).

A method for wireless communication at a UE is described. The method may include identifying a random-access preamble for transmission to a base station in a random-access channel occasion as part of a two-step random-access procedure, identifying data or control information for transmission to the base station as part of the two-step random-access procedure, and transmitting both the random-access preamble and the data or control information within the random-access channel occasion.

An apparatus for wireless communication at a UE is described. The apparatus may include a processor, memory coupled with the processor, and instructions stored in the memory. The instructions may be executable by the processor to cause the apparatus to identify a random-access preamble for transmission to a base station in a random-access channel occasion as part of a two-step random-access procedure, identify data or control information for transmission to the base station as part of the two-step random-access procedure, and transmit both the random-access preamble and the data or control information within the random-access channel occasion.

Another apparatus for wireless communication at a UE is described. The apparatus may include means for identifying a random-access preamble for transmission to a base station in a random-access channel occasion as part of a two-step random-access procedure, identifying data or control information for transmission to the base station as part of the two-step random-access procedure, and transmitting both the random-access preamble and the data or control information within the random-access channel occasion.

A non-transitory computer-readable medium storing code for wireless communication at a UE is described. The code may include instructions executable by a processor to identify a random-access preamble for transmission to a base station in a random-access channel occasion as part of a two-step random-access procedure, identify data or control information for transmission to the base station as part of the two-step random-access procedure, and transmit both the random-access preamble and the data or control information within the random-access channel occasion.

In some examples of the method, apparatuses, and non-transitory computer-readable medium described herein, transmitting both the random-access preamble and the data or control information within the random-access channel occasion may include operations, features, means, or instructions for transmitting the data or control information in the random-access channel occasion with the random-access preamble based on a number of bytes of the data or control information being below a threshold. In some examples of the method, apparatuses, and non-transitory computer-readable medium described herein, the threshold is configurable and is based at least in part on the random-access channel occasion.

In some examples of the method, apparatuses, and non-transitory computer-readable medium described herein, identifying the random-access preamble for transmission to the base station in the random-access channel occasion may include operations, features, means, or instructions for receiving a control message indicating a set of random-access channel occasion configurations, and selecting the random-access channel occasion from the set of random-access channel occasion configurations based on a content or quantity of the data or control information to be transmitted as part of the two-step random-access procedure. In some examples of the method, apparatuses, and non-transitory computer-readable medium described herein, each random-access channel occasion configuration indicates time and frequency resources for a random-access preamble transmission in a corresponding random-access channel occasion, a correspondence of the corresponding random-access channel occasion to a synchronization signal block, and a resource size for a data or control information transmission in the corresponding random-access channel occasion.

In some examples of the method, apparatuses, and non-transitory computer-readable medium described herein, the resource size for the data or control information transmission in each random-access channel occasion may be based on data or control information to be transmitted in the random-access channel occasion. In some examples of the method, apparatuses, and non-transitory computer-readable medium described herein, the resource size for the data or control information transmission in each random-access channel occasion may be fixed. In some examples of the method, apparatuses, and non-transitory computer-readable medium described herein, transmitting both the random-access preamble and the data or control information within the random-access channel occasion may include operations, features, means, or instructions for transmitting the random-access preamble and the data or control information in the random-access channel occasion in a first random-access message of the two-step random-access procedure.

Some examples of the method, apparatuses, and non-transitory computer-readable medium described herein may further include operations, features, means, or instructions for transmitting additional data or control information in a data channel in the first random-access message but outside of the random-access channel occasion. Some examples of the method, apparatuses, and non-transitory computer-readable medium described herein may further include operations, features, means, or instructions for transmitting an indication in the random-access channel occasion of whether additional data or control information may be transmitted in a data channel in the first random-access message. Some examples of the method, apparatuses, and non-transitory computer-readable medium described herein may further include operations, features, means, or instructions for transmitting an indication in the random-access channel occasion of resources to be used for transmitting additional data or control information in a data channel in the first random-access message.

Some examples of the method, apparatuses, and non-transitory computer-readable medium described herein may further include operations, features, means, or instructions for receiving a second random-access message from the base station as part of the two-step random-access procedure, the second random-access message being received based on transmission of the first random-access message. In some examples of the method, apparatuses, and non-transitory computer-readable medium described herein, the second random-access message includes a timing advance indication, power control parameters, an uplink grant, a downlink grant, a cell radio network temporary identifier, information for contention resolution, or a combination thereof. In some examples of the method, apparatuses, and non-transitory computer-readable medium described herein, the data or control information may be transmitted on a first set of resources adjacent to a second set of resources on which the random-access preamble may be transmitted in the random-access channel occasion.

A method for wireless communication at a base station is described. The method may include identifying a configuration for a random-access channel occasion to be allocated to one or more UEs, where the configuration indicates a first set of resources in the random-access channel occasion allocated for a random-access preamble transmission and a second set of resources in the random-access channel occasion allocated for a data or control information transmission, transmitting a control message indicating the configuration of the random-access channel occasion, and receiving, from a UE, a random-access preamble on the first set of resources in the random-access channel occasion and data or control information on the second set of resources in the random-access channel occasion as part of a two-step random-access procedure.

An apparatus for wireless communication at a base station is described. The apparatus may include a processor, memory coupled with the processor, and instructions stored in the memory. The instructions may be executable by the processor to cause the apparatus to identify a configuration for a random-access channel occasion to be allocated to one or more UEs, where the configuration indicates a first set of resources in the random-access channel occasion allocated for a random-access preamble transmission and a second set of resources in the random-access channel occasion allocated for a data or control information transmission, transmit a control message indicating the configuration of the random-access channel occasion, and receive, from a UE, a random-access preamble on the first set of resources in the random-access channel occasion and data or control information on the second set of resources in the random-access channel occasion as part of a two-step random-access procedure.

Another apparatus for wireless communication at a base station is described. The apparatus may include means for identifying a configuration for a random-access channel occasion to be allocated to one or more UEs, where the configuration indicates a first set of resources in the random-access channel occasion allocated for a random-access preamble transmission and a second set of resources in the random-access channel occasion allocated for a data or control information transmission, transmitting a control message indicating the configuration of the random-access channel occasion, and receiving, from a UE, a random-access preamble on the first set of resources in the random-access channel occasion and data or control information on the second set of resources in the random-access channel occasion as part of a two-step random-access procedure.

A non-transitory computer-readable medium storing code for wireless communication at a base station is described. The code may include instructions executable by a processor to identify a configuration for a random-access channel occasion to be allocated to one or more UEs, where the configuration indicates a first set of resources in the random-access channel occasion allocated for a random-access preamble transmission and a second set of resources in the random-access channel occasion allocated for a data or control information transmission, transmit a control message indicating the configuration of the random-access channel occasion, and receive, from a UE, a random-access preamble on the first set of resources in the random-access channel occasion and data or control information on the second set of resources in the random-access channel occasion as part of a two-step random-access procedure.

In some examples of the method, apparatuses, and non-transitory computer-readable medium described herein, receiving the random-access preamble and the data or control information in the random-access channel occasion may include operations, features, means, or instructions for receiving the data or control information in the random-access channel occasion with the random-access preamble based on a number of bytes of the data or control information being below a threshold. In some examples of the method, apparatuses, and non-transitory computer-readable medium described herein, the threshold is configurable and is based at least in part on the random-access channel occasion.

In some examples of the method, apparatuses, and non-transitory computer-readable medium described herein, the configuration of the random-access channel occasion further indicates a correspondence of the random-access channel occasion to a synchronization signal block. In some examples of the method, apparatuses, and non-transitory computer-readable medium described herein, a size of the second set of resources allocated for the data or control information transmission may be based on the data or control information to be transmitted in the random-access channel occasion. In some examples of the method, apparatuses, and non-transitory computer-readable medium described herein, a size of the second set of resources allocated for the data or control information transmission may be fixed.

In some examples of the method, apparatuses, and non-transitory computer-readable medium described herein, receiving the random-access preamble and the data or control information in the random-access channel occasion may include operations, features, means, or instructions for receiving the random-access preamble and the data or control information in the random-access channel occasion in a first random-access message of the two-step random-access procedure. Some examples of the method, apparatuses, and non-transitory computer-readable medium described herein may further include operations, features, means, or instructions for receiving additional data or control information in a data channel in the first random-access message but outside of the random-access channel occasion.

Some examples of the method, apparatuses, and non-transitory computer-readable medium described herein may further include operations, features, means, or instructions for receiving an indication in the random-access channel occasion of whether additional data or control information may be transmitted in a data channel in the first random-access message. Some examples of the method, apparatuses, and non-transitory computer-readable medium described herein may further include operations, features, means, or instructions for receiving an indication in the random-access channel occasion of resources to monitor for additional data or control information in a data channel in the first random-access message.

Some examples of the method, apparatuses, and non-transitory computer-readable medium described herein may further include operations, features, means, or instructions for transmitting a second random-access message to the UE as part of the two-step random-access procedure, the second random-access message being transmitted based on reception of the first random-access message. In some examples of the method, apparatuses, and non-transitory computer-readable medium described herein, the second random-access message includes a timing advance indication, power control parameters, an uplink grant, a downlink grant, a cell radio network temporary identifier, information for contention resolution, or a combination thereof. In some examples of the method, apparatuses, and non-transitory computer-readable medium described herein, the first set of resources allocated for the random-access preamble transmission may be adjacent to the second set of resources allocated for the data or control information transmission.

DETAILED DESCRIPTION

Figure 1:
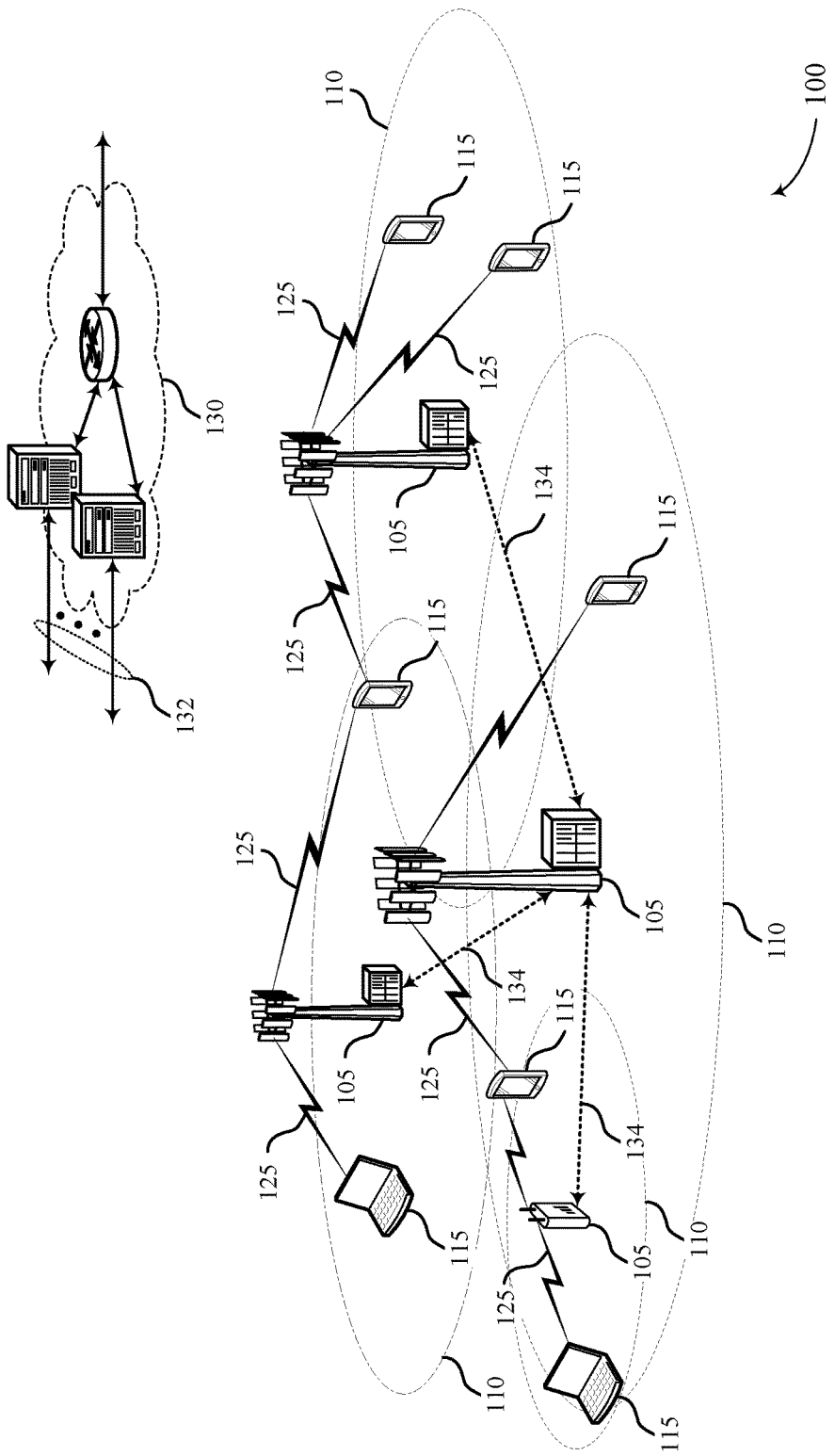
FIG. 1 illustrates an example of a wireless communications system that supports random-access channel (RACH) occasion configuration in accordance with aspects of the present disclosure.

In some wireless communications systems, a user equipment (UE) may use a two-step random-access channel (RACH) procedure to establish or re-establish a connection with a base station and/or identify suitable parameters and configurations for communicating with the base station. The two-step RACH procedure may include a transmission of a first RACH message from a UE to a base station and a transmission of a second RACH message from the base station to the UE. In some cases, as part of a two-step RACH procedure, it may be appropriate for a UE to transmit data or control information in a first RACH message to a base station. The data or control information may include a radio resource control (RRC) setup request, an RRC reestablishment request, an RRC resume request, an RRC system information request, or a cell radio network temporary identifier (C-RNTI).

Accordingly, in conventional systems, the UE may be configured to transmit the data or control information to the base station in a data channel in the first RACH message. However, the overhead associated with transmitting the data channel may be high (e.g., the overhead may include cyclic redundancy check (CRC) overhead, channel coding overhead, higher layer header overhead, or the like). Further, the two-step RACH procedure may be a contention-based RACH procedure, and the first RACH message may conflict with RACH messages from other UEs. Thus, if the amount of resources used to transmit the PUSCH in the first RACH message is large, there may be a greater chance that the first RACH message will conflict with RACH messages from other UEs, resulting in RACH failure.

As described herein, a UE may support efficient techniques for transmitting data and control information in a first RACH message to a base station as part of a two-step RACH procedure. In particular, rather than or in addition to transmitting data or control information in a physical uplink shared channel (PUSCH) in the first RACH message, a UE may transmit the data or control information along with a RACH preamble in a RACH occasion in the first RACH message.

Using these techniques, in some instances (e.g., when the number of bytes of data and control information to be transmitted is low or below a threshold), the UE may transmit the data or control information in a RACH occasion in a first RACH message without transmitting the PUSCH in the first RACH message, and the overhead associated with transmitting the PUSCH may be eliminated (e.g., cyclic redundancy check (CRC) overhead, channel coding overhead, higher layer header overhead). Further, in other instances (e.g., when the number of bytes of data and control information to be transmitted is high or above a threshold), the UE may transmit the data or control information in a RACH occasion in a first RACH message and in a PUSCH in the first RACH message. In such instances, since the amount of data or control information transmitted in the PUSCH in the first RACH message may be minimized (e.g., because some of the data or control information is transmitted in the RACH occasion), the chances that the first RACH message will conflict with RACH messages from other UEs may be lowered, resulting in a lower possibility of RACH failure.

Aspects of the disclosure introduced above are described below in the context of a wireless communications system. Examples of processes and signaling exchanges that support RACH occasion configuration are then described. Aspects of the disclosure are further illustrated by and described with reference to apparatus diagrams, system diagrams, and flowcharts that relate to RACH occasion configuration.

FIG. 1 illustrates an example of a wireless communications system 100 that supports RACH occasion configuration in accordance with aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" may refer to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

The term "carrier" may refer to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in a frequency division duplexing (FDD) mode) or be configured to carry downlink and uplink communications (e.g., in a time division duplexing (TDD) mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz. Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In wireless communications system 100, a UE 115 may use a RACH procedure to establish or re-establish a connection with a base station 105 and/or identify suitable parameters and configurations for communicating with the base station 105. Wireless communications system 100 may support four-step RACH procedures and two-step RACH procedures. A four-step RACH procedure may include four message exchanges between a UE 115 and a base station 105, and a two-step RACH procedure may include two message exchanges between a UE 115 and a base station 105. In both procedures, it may be appropriate for a UE 115 to transmit data or control information to a base station 105. In a four-step RACH procedure, the UE 115 may transmit the data or control information in a third RACH message (e.g., MSG3) to the base station 105. In a two-step RACH procedure the UE 115 may transmit the data or control information in a first RACH message (e.g., MSG1 or MSGA) to the base station 105.

The data or control information may include a MAC sub-header (e.g., 1 byte) in addition an RRC setup request (e.g., 6 bytes), an RRC reestablishment request (e.g., 6 bytes), an RRC resume request (e.g., 6 bytes), an RRC system information request (e.g., 6 bytes), or a cell radio network temporary identifier (C-RNTI) (e.g., 2 bytes). The content of the data or control information transmitted in a RACH procedure may be based on the intention of the RACH procedure. For instance, a UE 115 may transmit an RRC setup request to gain initial access to a base station 105 from an RRC_IDLE mode, an RRC re-establishment request to re-establish an RRC connection, an RRC resume request to transition from an RRC_INACTIVE mode, an RRC system information request to request system information, or a C-RNTI for a beam failure recovery (BFR) procedure, a handover procedure, a buffer status reporting (BSR) procedure, a beam correspondence indication, or other uplink control information. Thus, the payload including the data or control information may be one of 1, 2, 3, or 7 bytes (e.g., with RRC message transmissions) or one of 1, 2, or 3 bytes (e.g., without RRC message transmissions when the UE 115 is in an RRC_CONNECTED mode).

Figure 2:
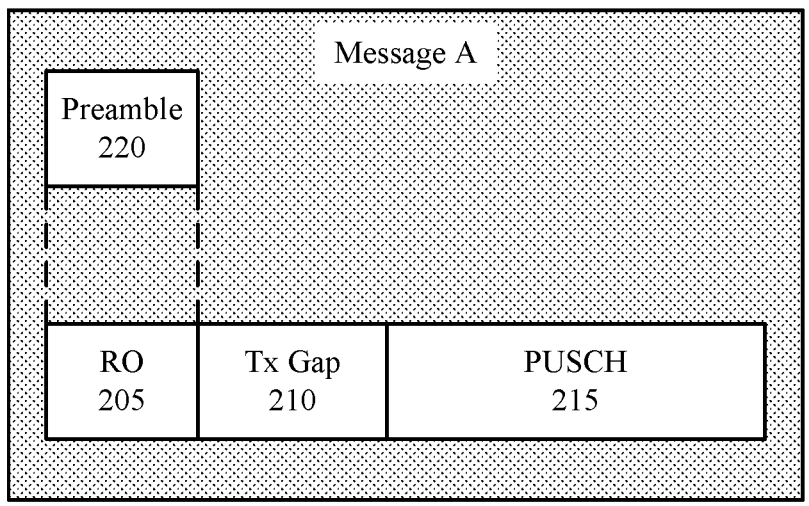
FIG. 2 illustrates an example of a first RACH message in a two-step RACH procedure in accordance with aspects of the present disclosure.

FIG. 2 illustrates an example of a first RACH message 200 that supports RACH occasion configuration in accordance with aspects of the present disclosure. In some examples, first RACH message 200 may be an example of a first RACH message (e.g., Message A (MSGA)) used in wireless communications system 100. For example, a first RACH message 200 may be an example of a first RACH message sent between a UE 115 and a base station 105 as part of a two-step RACH procedure. As described herein, a UE 115 in wireless communications system 100 may support efficient techniques for transmitting data and control information in a first RACH message 200 to a base station as part of a two-step RACH procedure.

As described above, in a four-step RACH procedure, a UE 115 may transmit a RACH preamble in a first RACH message of the four-step RACH procedure and may transmit data or control information in a third RACH message of the four-step RACH procedure. In a two-step RACH procedure, however, a UE 115 may transmit both a RACH preamble and data or control information in the first RACH message. Accordingly, in conventional systems, the UE 115 may be configured to transmit the data or control information to the base station in a PUSCH in the first RACH message.

In the example of FIG. 2, a UE 115 may transmit a RACH preamble 220 to a base station 105 in a RACH occasion 205 of the first RACH message 200 (e.g., Message A (MGSA)). After a transmission gap 210, the UE 115 may then transmit a PUSCH 215 (e.g., on resource blocks different from the RACH occasion 205), including data or control information, to the base station 105.

In some cases, however, the overhead associated with transmitting the PUSCH 215 may be high (e.g., the overhead may include cyclic redundancy check (CRC) overhead, channel coding overhead, higher layer header overhead, or the like). Further, the two-step RACH procedure may be a contention-based RACH procedure, and the first RACH message 200 may conflict with RACH messages from other UEs. Thus, if the amount of resources used to transmit the PUSCH 215 in the first RACH message 200 is large (e.g., larger than a threshold), there may be a greater chance that the first RACH message 200 will conflict with RACH messages from other UEs, which may result in RACH failure.

To improve reliability of RACH procedures (e.g., in cases where the amount of resources used to transmit a PUSCH 215 is above a threshold), a UE 115 may transmit, to a base station, data or control information in a first RACH message as part of a two-step RACH procedure. In particular, rather than or in addition to transmitting data or control information in a PUSCH in the first RACH message, a UE 115 may transmit the data or control information along with a RACH preamble (e.g., RACH preamble 220) in a RACH occasion (e.g., RACH occasion 205) in the first RACH message (e.g., first RACH message 200).

Figure 3:
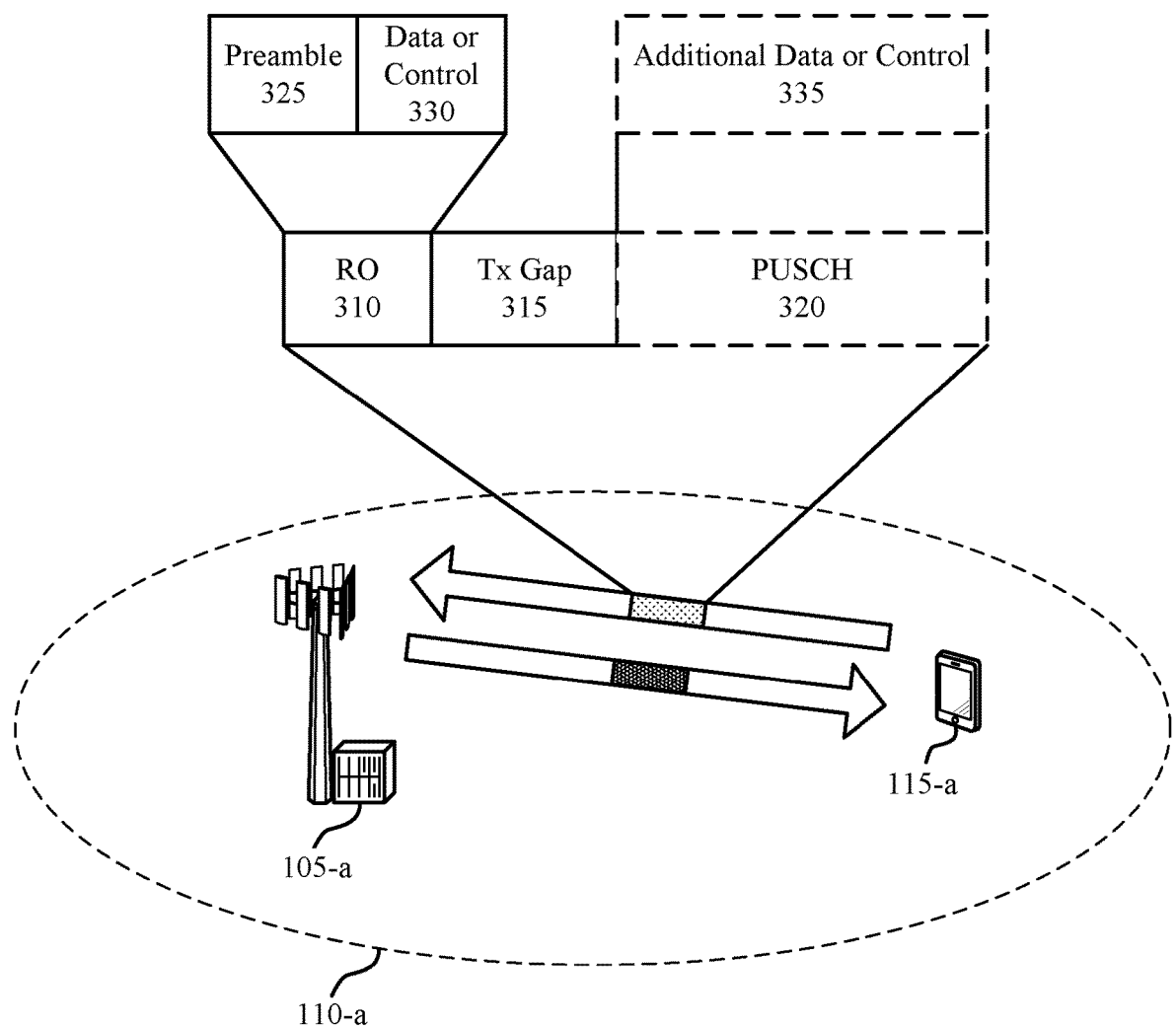
FIG. 3 illustrates an example of a wireless communications system that supports RACH occasion configuration in accordance with aspects of the present disclosure.

FIG. 3 illustrates an example of a wireless communications system 300 that supports RACH occasion configuration in accordance with aspects of the present disclosure. Wireless communications system 300 includes base station 105-a, which may be an example of a base station 105 described with reference to FIG. 1. Wireless communications system 300 also includes UE 115-a, which may be an example of a UE 115 described with reference to FIG. 1. Base station 105-a may provide communication coverage for a respective coverage area 110-a, which may be an example of a coverage area 110 described with reference to FIG. 1. Wireless communications system 300 may implement aspects of wireless communications system 100. For example, UE 115-a in wireless communications system 300 may support efficient techniques for transmitting data and control information in a first RACH message 305 to a base station 105-a as part of a two-step RACH procedure.

In the example of FIG. 3, UE 115-a may determine to perform a two-step RACH procedure to establish or re-establish a connection with a base station 105-a. Additionally or alternatively, UE 115-a may identify suitable parameters and configurations for communicating with the base station 105-a. Accordingly, UE 115-a may transmit a first RACH message 305 (e.g., MSG1 or MSGA) to base station 105-a as part of the two-step RACH procedure. The first RACH message 305 may include a RACH occasion 310, which may further contain a RACH preamble 325 and data or control information 330. The first RACH message 305 may also include a transmission gap 315 and a PUSCH 320, which may further contain additional data or control information 335. Upon reception of the first RACH message 305, base station 105-a may transmit a second RACH message 340 (e.g., MSG2 or MSGB) to UE 115-a (e.g., confirming receipt of the first RACH message 305).

UE 115-a may identify a RACH preamble 325 and data or control information 330 to transmit to base station 105-a. UE 115-a may transmit the RACH preamble 325 to base station 105-a in a RACH occasion 310 in the first RACH message 305. UE 115-a may also transmit the identified data or control information 330 in the RACH occasion 310 along with the RACH preamble 325. In some cases, after a transmission gap 315, UE 115-a may also transmit additional data or control information 335 in a PUSCH 320 in the first RACH message 305.

In some aspects, if UE 115-a determines that the number of bytes of data or control information to be transmitted in the first RACH message 305 is low or below a threshold (e.g., 1-3 bytes for BFR procedures, BSR transmissions), UE 115-a may transmit all of the data or control information in the RACH occasion 310 in the first RACH message 305 (e.g., only data or control information 330). In such aspects, UE 115-a may transmit an indication in the RACH occasion 310 that no additional data or control information 335 is to be transmitted in a PUSCH 320 in the first RACH message 305. In other aspects, if UE 115-a determines that the number of bytes of data or control information to be transmitted in the first RACH message 305 is high or above a threshold, UE 115-a may transmit data or control information 330 in the RACH occasion 310 and additional data or control information 335 in the PUSCH 320. In such aspects, UE 115-a may transmit an indication in the RACH occasion 310 that additional data or control information 335 is transmitted in a PUSCH 320 in the first RACH message 305.

In some cases, in the first RACH message 305, UE 115-*a* may transmit an explicit indication of resources of the PUSCH 320 used to transmit the additional data or control information 335 such that base station 105-*a* may be able to monitor the resources of the PUSCH 320 to receive the additional data or control information 335. In other cases, the resources of the PUSCH 320 used to transmit the additional data or control information 335 may be implicitly indicated, and base station 105-*a* may identify which resources of the PUSCH 320 to monitor for the additional data or control information 335 based on the resources of the RACH occasion 310 (e.g., the PUSCH resources may be a certain number of symbols after the RACH occasion).

Thus, first RACH message 305 may include, but is not limited to, a RACH preamble 325, data or control information 330 (e.g., including a C-RNTI and other information depending on the RACH intention), additional data or control information 335, an indication of the presence of a PUSCH 320, an indication of PUSCH resources, a cyclic prefix, a guard time, and an optional cyclic redundancy check (CRC). As described above, UE 115-*a* may transmit the RACH preamble 325, the data or control information 330, the optional indication of the presence of the PUSCH 320, and the optional indication of PUSCH resources in a RACH occasion in the first RACH message 305. Then, after the transmission gap 315, UE 115-*a* may optionally transmit the additional data or control information 335 in a PUSCH 320 in the first RACH message 305. Once base station 105-*a* receives the first RACH message 305, base station 105-*a* may transmit a second RACH message 340 to UE 115-*a* (e.g., confirming receipt of the first RACH message 305).

Figure 4:
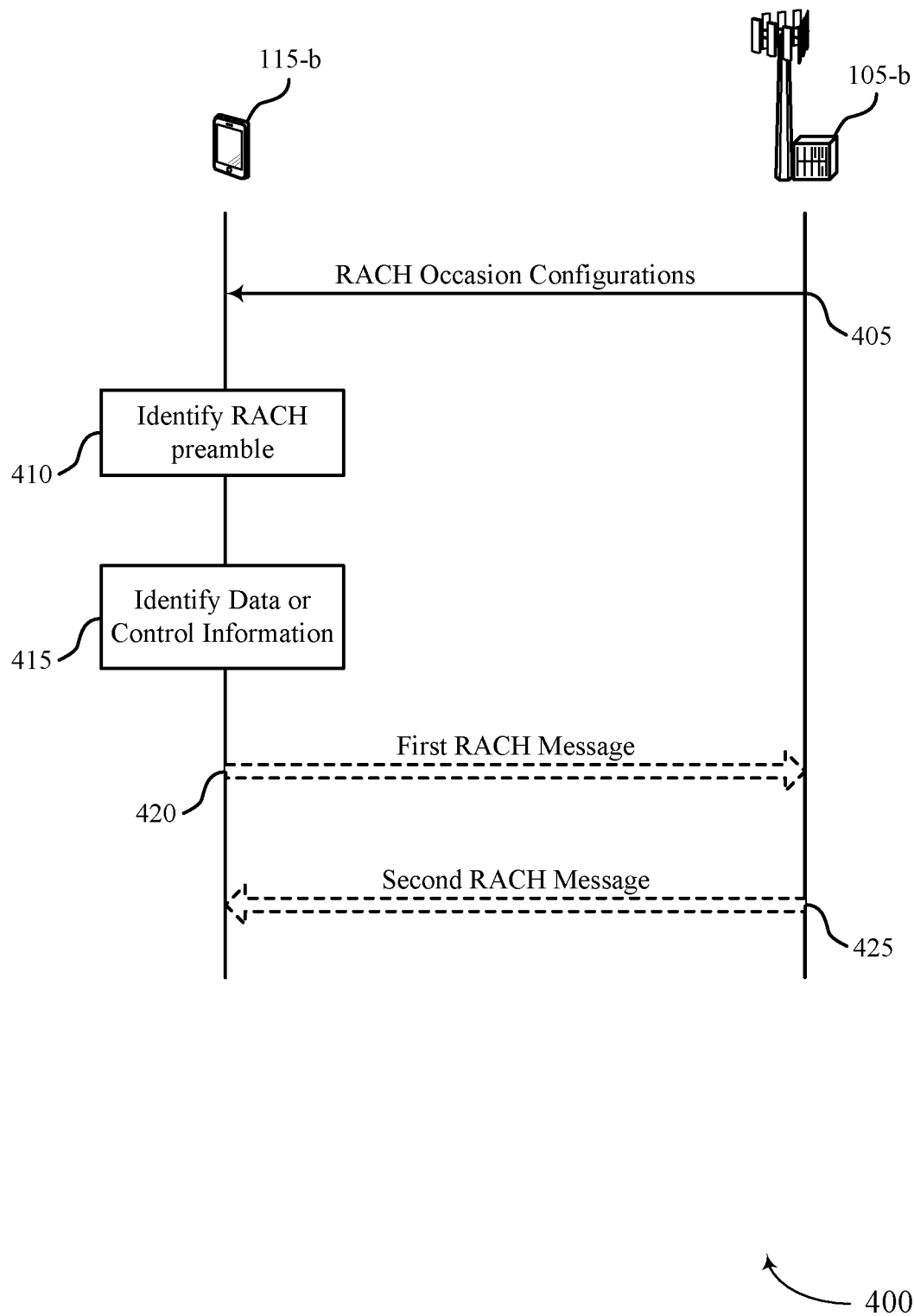
FIG. 4 illustrates an example of a process flow that supports RACH occasion configuration in accordance with aspects of the present disclosure.

FIG. 4 illustrates an example of a process flow 400 that supports RACH occasion configuration in accordance with aspects of the present disclosure. Process flow 400 illustrates aspects of techniques performed by a base station 105-*b*, which may be an example of a base station 105 described with reference to FIGS. 1-3. Process flow 400 also illustrates aspects of techniques performed by a UE 115-*b*, which may be an example of a UE 115 described with reference to FIGS. 1-3. Process flow 400 may implement aspects of wireless communications systems 100 and 300. For example, UE 115-*b* in process flow 400 may support efficient techniques for transmitting data and control information in a first RACH message to a base station 105-*b* as part of a two-step RACH procedure. In particular, rather than or in addition to transmitting data or control information in a PUSCH in the first RACH message, UE 115-*b* may transmit the data or control information along with a RACH preamble in a RACH occasion in the first RACH message.

At 405, base station 105-*b* may identify configurations for a set of RACH occasions to be used in a two-step RACH procedure, where at least one of the configurations indicates a first set of resources in the RACH occasion allocated for a RACH preamble transmission and a second set of resources allocated for a data or control information transmission. Base station 105-*b* may transmit a control message (e.g., a system information block (SIB)) indicating the RACH occasion configurations. In some cases, the resources allocated for RACH occasions to be used for RACH preamble transmissions and data or control information transmissions (e.g., in two-step RACH procedures) may be orthogonal to resources allocated for RACH occasions to be used for only RACH preamble transmissions (e.g., in four-step RACH procedures). The RACH preambles (e.g., made up of gold sequences) may be the same for both types of RACH occasions. For example, a RACH preamble available to be transmitted in a RACH occasion to be used for both RACH preamble transmissions and data or control information may be the same as a RACH preamble available to be transmitted in a RACH occasion to be used for only RACH preamble transmissions (e.g., without data or control information).

Each RACH occasion configuration transmitted by base station 105-*b* at 405 may indicate the time and frequency resources to be used for the RACH preamble transmission (e.g., the first set of resources), a resource or payload size for the data or control information transmission (e.g., where the resource or payload size may be indicated by a RACH occasion type), a correspondence of the RACH occasion to an SSB, a modulation and coding scheme (MCS) to be used for the transmissions in the RACH occasion, etc.

At 410, UE 115-*b* may select the RACH occasion based on the content or quantity of the data or control information to be transmitted to base station 105-*b* as part of the RACH procedure. For example, UE 115-*b* may select the RACH occasion based on the intention of the RACH procedure (e.g., re-establishing an RRC connection, transmitting a BSR, or the like). UE 115-*b* may identify a RACH preamble for transmission to base station 105-*b* in the RACH occasion as part of a two-step RACH procedure.

At 415, UE 115-*b* may identify data or control information for transmission to base station 105-*b* as part of the two-step RACH procedure.

At 420, UE 115-*b* may transmit both the RACH preamble and the data or control information within the RACH occasion in a first RACH message. In some cases, as described above with reference to FIG. 3, UE 115-*b* may also transmit additional data or control information in the first RACH message (e.g., in a PUSCH that is outside of the RACH occasion).

In some cases, the resource size for the data or control information transmission in a RACH occasion may be based on the content or quantity of data or control information to be transmitted in the RACH occasion (e.g., based on the RACH intention). Accordingly, when UE 115-*b* selects a RACH occasion in which to transmit data or control information in a two-step RACH procedure based on an intention of the two-step RACH procedure, the UE 115-*b* may have sufficient resources to transmit the data and control information in the RACH occasion. In other cases, the resource size for the data or control information transmission in a RACH occasion may be fixed. In such cases, when UE 115-*b* selects a RACH occasion in which to transmit data or control information in a two-step RACH procedure based on an intention of the two-step RACH procedure, the UE 115-*b* may transmit the data and control information in the RACH occasion on the fixed resources. Further, if additional resources are available after the data and control information is mapped to the fixed resources, UE 115-*b* may repeat portions of the data and control information in the RACH occasion on the additional resources. As an example, if the resource size of a RACH occasion is sufficient for a one-byte payload, and UE 115-*b* determines to transmit a C-RNTI in a two-step RACH procedure (e.g., for a BFR procedure), UE 115-*b* may transmit the C-RNTI once in the RACH occasion. In another example, if the resource size of a RACH occasion is sufficient for a three-byte payload, and UE 115-*b* determines to transmit a C-RNTI in a two-step RACH procedure (e.g., for a BFR procedure), UE 115-*b* may repeat the C-RNTI three times in the RACH occasion.

In some cases, the channel coding used to encode the first RACH message may be based on the number of bits in the first RACH message. For instance, if the number of bits in the first RACH message is below or equal to a threshold (e.g., 11 bits), UE 115-*b* may use an NR resource management coding scheme to encode the first RACH message. Alternatively, if the number of bits in the first RACH message is above a threshold (e.g., 11 bits), UE 115-*b* may use a polar coding scheme to encode the first RACH message.

At 425, after base station 105-*b* receives the first RACH message, base station 105-*b* may transmit a second RACH message to UE 115-*b* confirming receipt of the first RACH message. The second RACH message may include timing advance information, power control parameters, an uplink grant, a downlink grant, a cell radio network temporary identifier (C-RNTI), information for contention resolution, etc. Thus, UE 115-*b* may use the information in the second RACH message for subsequent communications with base station 105-*b*.

It is to be understood that a RACH occasion (e.g., or RACH resource) may be selected from a number of RACH occasions (e.g., or RACH resources) configured by the base station 105-*a* in a control message (e.g., system information block (SIB)), and the RACH occasion (e.g., RACH occasion 310) may be different from a PUSCH (e.g., PUSCH 320). In a four-step RACH procedure, a RACH occasion may correspond to the resources (e.g., time, frequency, and/or spatial resources) on which a RACH preamble is transmitted using a configured RACH preamble format (e.g., with a single transmit beam). In a two-step RACH procedure, a RACH occasion may also correspond to the resources (e.g., time frequency, and/or spatial resources) on which a RACH preamble is transmitted using a configured RACH preamble format (e.g., with a single transmit beam). However, as described herein, a UE may also transmit data or control information in a RACH occasion in a first RACH message of a two-step RACH procedure.

Figure 5:
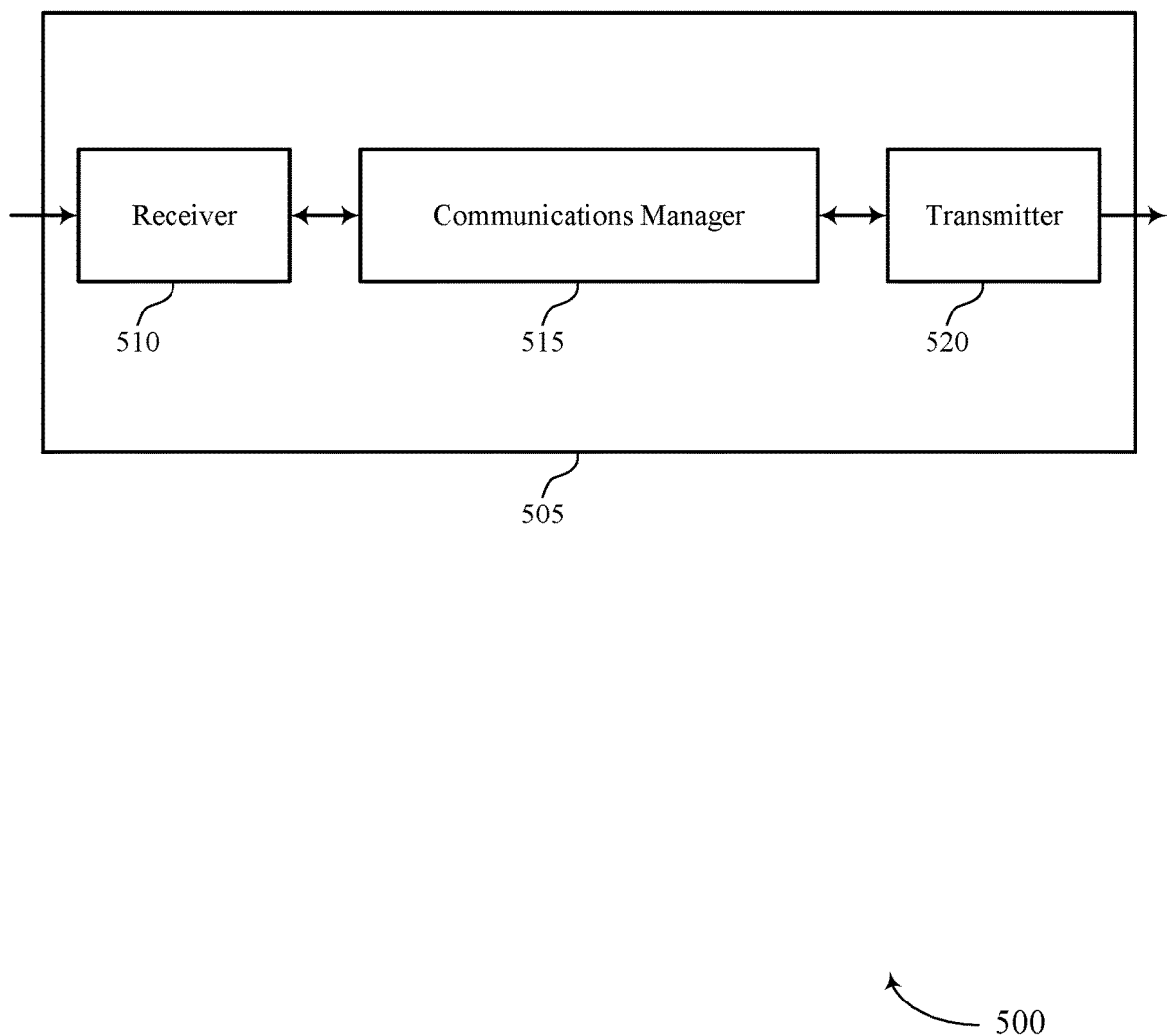
FIGS. 5 and 6 show block diagrams of devices that support RACH occasion configuration in accordance with aspects of the present disclosure.

FIG. 5 shows a block diagram 500 of a device 505 that supports RACH occasion configuration in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to RACH occasion configuration). Information may be passed on to other components of the device 505. The receiver 510 may be an example of aspects of the transceiver 820 described with reference to FIG. 8. The receiver 510 may utilize a single antenna or a set of antennas.

The communications manager 515 may identify a random-access preamble for transmission to a base station in a random-access channel occasion as part of a two-step random-access procedure, identify data or control information for transmission to the base station as part of the two-step random-access procedure, and transmit both the random-access preamble and the data or control information within the random-access channel occasion. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

In some examples, the communications manager 515 may be implemented as an integrated circuit or chipset for a mobile device modem, and the receiver 510 and transmitter 520 may be implemented as analog components (for example, amplifiers, filters, antennas, etc.) coupled with the mobile device modem to enable wireless transmission and reception.

The communications manager 515 as described herein may be implemented to realize one or more potential advantages. Various implementations may reduce overhead associated with RACH procedures. At least some implementations may enable the communications manager 515 to transmit data and control information in a first RACH message and, as such, refrain from transmitting data and control information in a PUSCH transmission. At least some implementations may enable the communications manager 515 to reduce the amount of data or control information transmitted in a PUSCH in a first RACH message.

Based on implementing the overhead reduction techniques as described herein, one or more processors of the device 505 (for example, processor(s) controlling or incorporated with one or more of receiver 510, communications manager 515, and transmitter 520) may improve communication reliability or efficiency. For example, a UE may send data and control information to a base station along with a RACH preamble in a first RACH message. Accordingly, the UE may refrain from transmitting a PUSCH in the first RACH message or may transmit a reduced amount of data and control information in a PUSCH in the first RACH message. As such, the amount of overhead associated with transmitting a PUSCH may be reduced and the likelihood of RACH failure may decrease.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
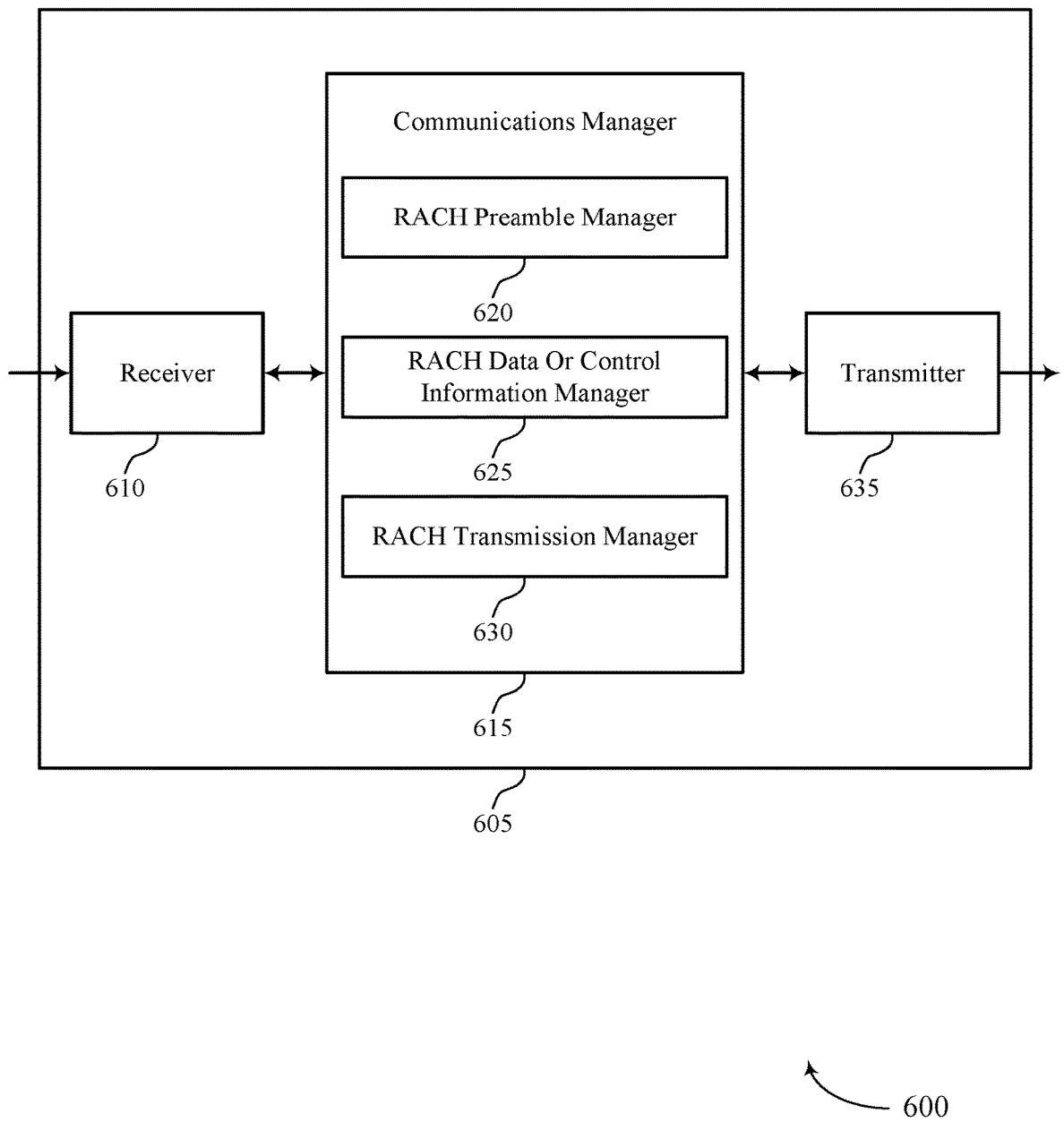

FIG. 6 shows a block diagram 600 of a device 605 that supports RACH occasion configuration in accordance with aspects of the present disclosure. The device 605 may be an example of aspects of a device 505 or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to RACH occasion configuration, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a RACH preamble manager 620, a RACH data or control information manager 625, and a RACH transmission manager 630. The communications manager 615 may be an example of aspects of the communications manager 810 described herein.

The RACH preamble manager 620 may identify a random-access preamble for transmission to a base station in a random-access channel occasion as part of a two-step random-access procedure. The RACH data or control information manager 625 may identify data or control information for transmission to the base station as part of the two-step random-access procedure. The RACH transmission manager 630 may transmit both the random-access preamble and the data or control information within the random-access channel occasion.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
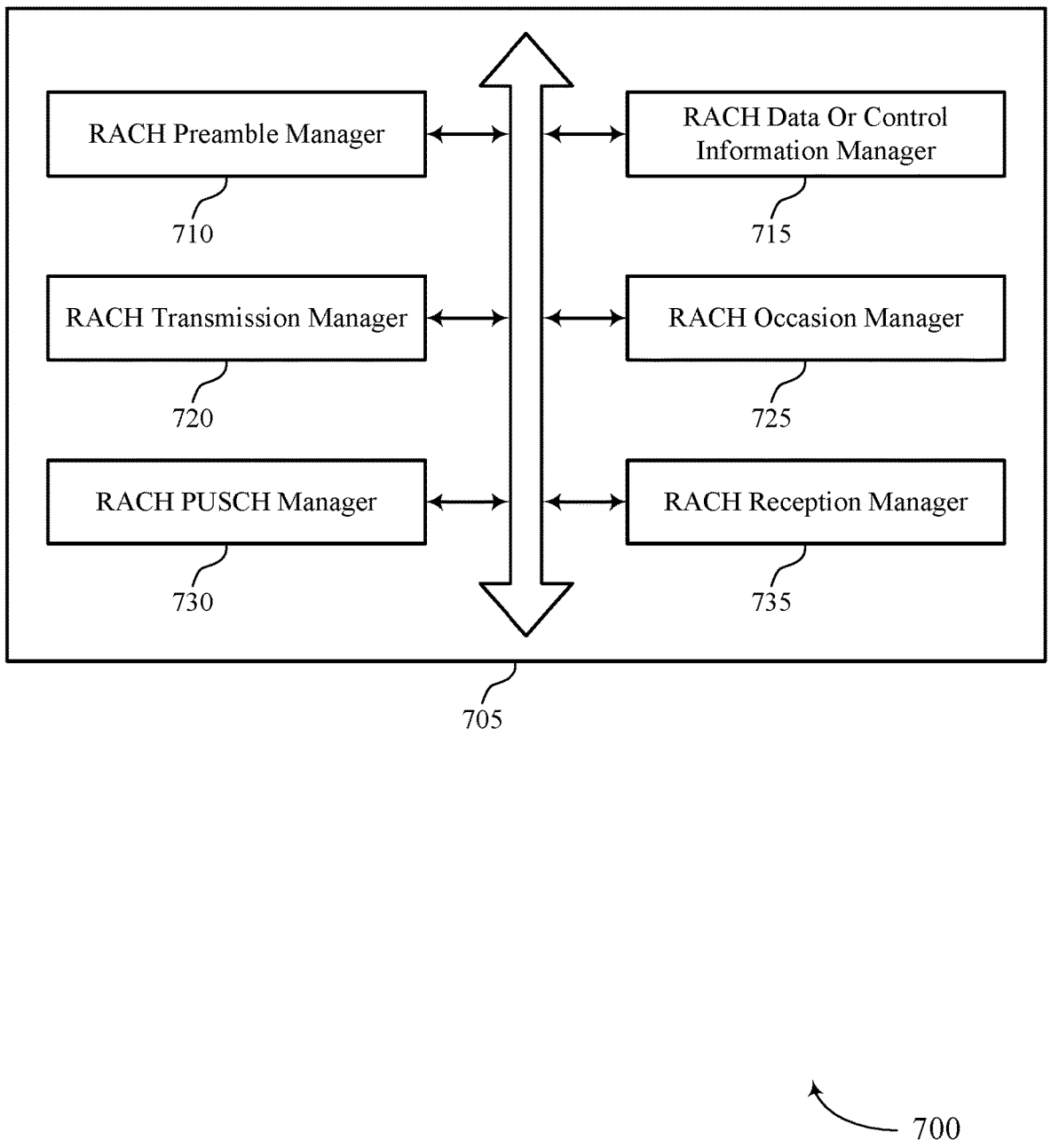
FIG. 7 shows a block diagram of a communications manager that supports RACH occasion configuration in accordance with aspects of the present disclosure.

FIG. 7 shows a block diagram 700 of a communications manager 705 that supports RACH occasion configuration in accordance with aspects of the present disclosure. The communications manager 705 may be an example of aspects of a communications manager 515, a communications manager 615, or a communications manager 810 described herein. The communications manager 705 may include a RACH preamble manager 710, a RACH data or control information manager 715, a RACH transmission manager 720, a RACH occasion manager 725, a RACH PUSCH manager 730, and a RACH reception manager 735. Each of these modules may communicate, directly or indirectly, with one another (e.g., via one or more buses).

The RACH preamble manager 710 may identify a random-access preamble for transmission to a base station in a random-access channel occasion as part of a two-step random-access procedure. The RACH data or control information manager 715 may identify data or control information for transmission to the base station as part of the two-step random-access procedure. In some cases, the data or control information is transmitted on a first set of resources adjacent to a second set of resources on which the random-access preamble is transmitted in the random-access channel occasion.

The RACH transmission manager 720 may transmit both the random-access preamble and the data or control information within the random-access channel occasion. In some examples, the RACH transmission manager 720 may transmit the data or control information in the random-access channel occasion with the random-access preamble based on a number of bytes of the data or control information being below a threshold. In some cases, the threshold may be configurable (e.g., signaled to a UE from a base station) and may be based at least in part on the random-access channel occasion (e.g., different RACH occasions may have different thresholds). In some examples, the RACH transmission manager 720 may transmit the random-access preamble and the data or control information in the random-access channel occasion in a first random-access message of the two-step random-access procedure. The RACH occasion manager 725 may receive a control message indicating a set of random-access channel occasion configurations.

In some examples, the RACH occasion manager 725 may select the random-access channel occasion from the set of random-access channel occasion configurations based on a content or quantity of the data or control information to be transmitted as part of the two-step random-access procedure. In some cases, each random-access channel occasion configuration indicates time and frequency resources for a random-access preamble transmission in a corresponding random-access channel occasion, a correspondence of the corresponding random-access channel occasion to a synchronization signal block, and a resource size for a data or control information transmission in the corresponding random-access channel occasion. In some cases, the resource size for the data or control information transmission in each random-access channel occasion is based on data or control information to be transmitted in the random-access channel occasion. In some cases, the resource size for the data or control information transmission in each random-access channel occasion is fixed.

The RACH PUSCH manager 730 may transmit additional data or control information in a data channel in the first random-access message but outside of the random-access channel occasion. In some examples, the RACH PUSCH manager 730 may transmit an indication in the random-access channel occasion of whether additional data or control information is transmitted in a data channel in the first random-access message. In some examples, the RACH PUSCH manager 730 may transmit an indication in the random-access channel occasion of resources to be used for transmitting additional data or control information in a data channel in the first random-access message. The RACH reception manager 735 may receive a second random-access message from the base station as part of the two-step random-access procedure, the second random-access message being received based on transmission of the first random-access message. In some cases, the second random-access message includes a timing advance indication, power control parameters, an uplink grant, a downlink grant, a cell radio network temporary identifier, information for contention resolution, or a combination thereof.

Figure 8:
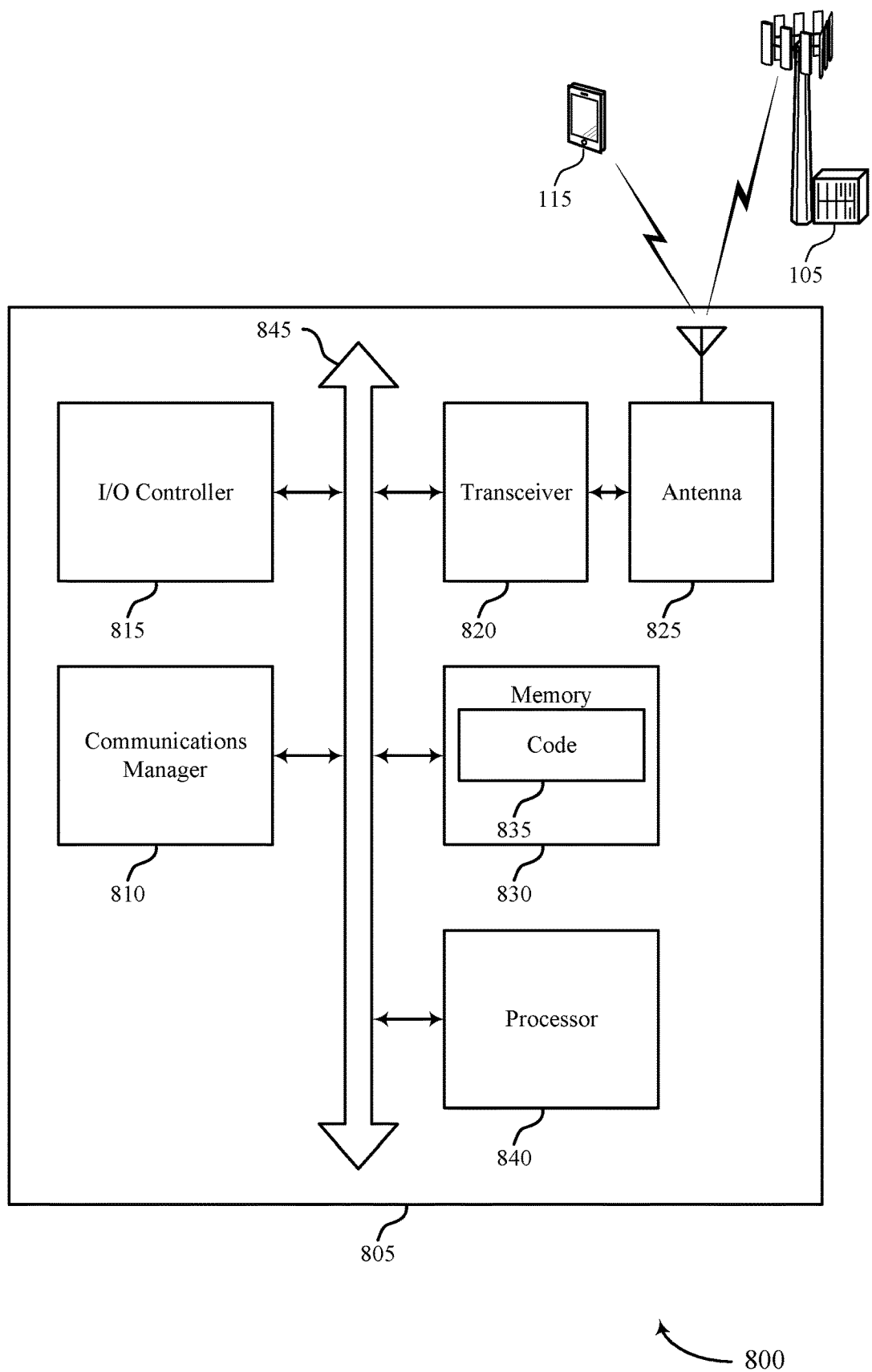
FIG. 8 shows a diagram of a system including a device that supports RACH occasion configuration in accordance with aspects of the present disclosure.

FIG. 8 shows a diagram of a system 800 including a device 805 that supports RACH occasion configuration in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may identify a random-access preamble for transmission to a base station in a random-access channel occasion as part of a two-step random-access procedure, identify data or control information for transmission to the base station as part of the two-step random-access procedure, and transmit both the random-access preamble and the data or control information within the random-access channel occasion.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting RACH occasion configuration).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
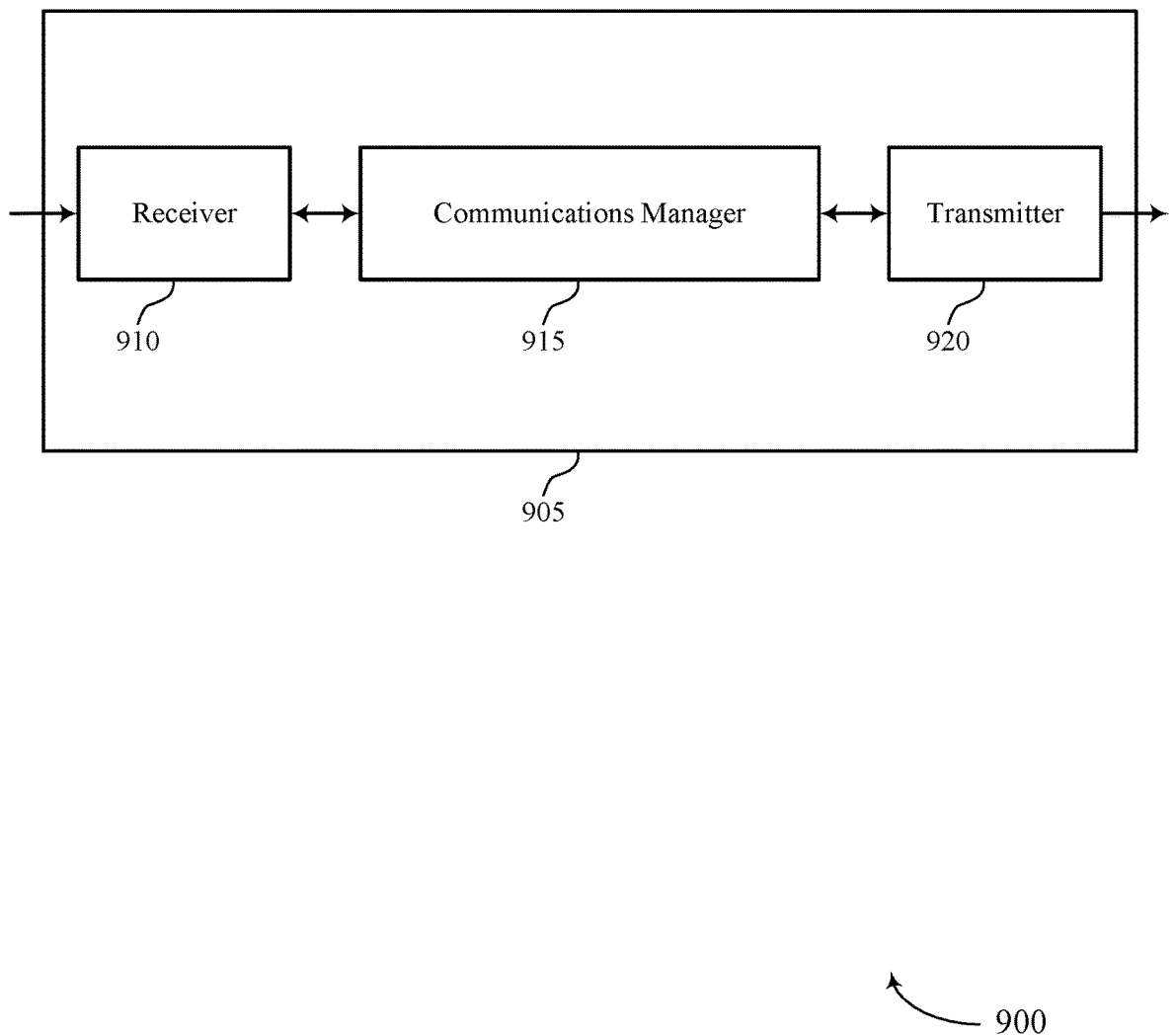
FIGS. 9 and 10 show block diagrams of devices that support RACH occasion configuration in accordance with aspects of the present disclosure.

FIG. 9 shows a block diagram 900 of a device 905 that supports RACH occasion configuration in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to RACH occasion configuration, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may identify a configuration for a random-access channel occasion to be allocated to one or more UE, where the configuration indicates a first set of resources in the random-access channel occasion allocated for a random-access preamble transmission and a second set of resources in the random-access channel occasion allocated for a data or control information transmission, transmit a control message indicating the configuration of the random-access channel occasion, and receive, from a UE, a random-access preamble on the first set of resources in the random-access channel occasion and data or control information on the second set of resources in the random-access channel occasion as part of a two-step random-access procedure. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
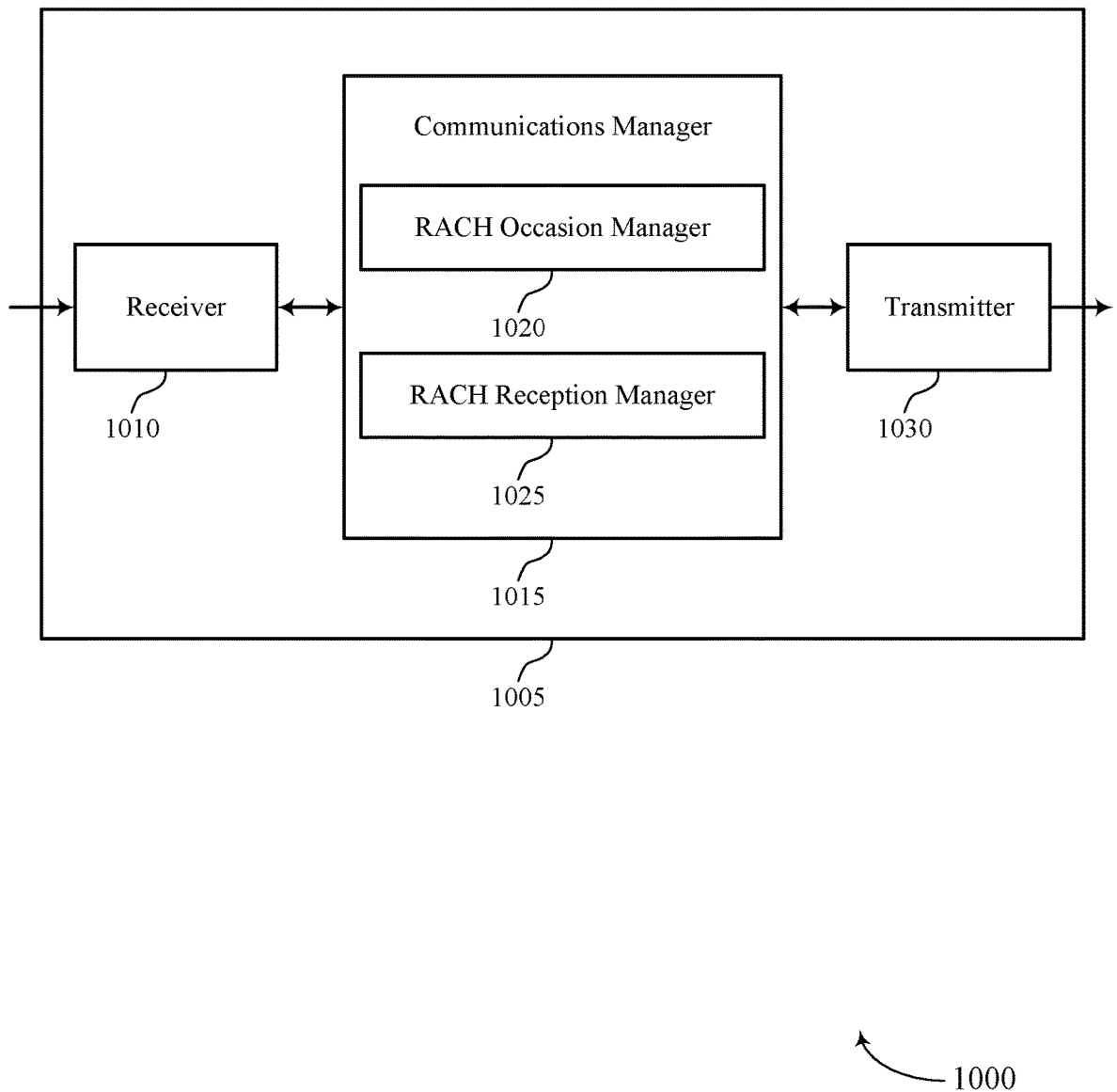

FIG. 10 shows a block diagram 1000 of a device 1005 that supports RACH occasion configuration in accordance with aspects of the present disclosure. The device 1005 may be an example of aspects of a device 905 or a base station 105 as described herein. The device 1005 may include a receiver 1010, a communications manager 1015, and a transmitter 1030. The device 1005 may also include a processor. Each of these components may be in communication with one another (e.g., via one or more buses).

The receiver 1010 may receive information such as packets, user data, or control information associated with various information channels (e.g., control channels, data channels, and information related to RACH occasion configuration). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a RACH occasion manager 1020 and a RACH reception manager 1025. The communications manager 1015 may be an example of aspects of the communications manager 1210 described herein.

The RACH occasion manager 1020 may identify a configuration for a random-access channel occasion to be allocated to one or more UE, where the configuration indicates a first set of resources in the random-access channel occasion allocated for a random-access preamble transmission and a second set of resources in the random-access channel occasion allocated for a data or control information transmission and transmit a control message indicating the configuration of the random-access channel occasion. The RACH reception manager 1025 may receive, from a UE, a random-access preamble on the first set of resources in the random-access channel occasion and data or control information on the second set of resources in the random-access channel occasion as part of a two-step random-access procedure.

The transmitter 1030 may transmit signals generated by other components of the device 1005. In some examples, the transmitter 1030 may be collocated with a receiver 1010 in a transceiver module. For example, the transmitter 1030 may be an example of aspects of the transceiver 1220 described with reference to FIG. 12. The transmitter 1030 may utilize a single antenna or a set of antennas.

Figure 11:
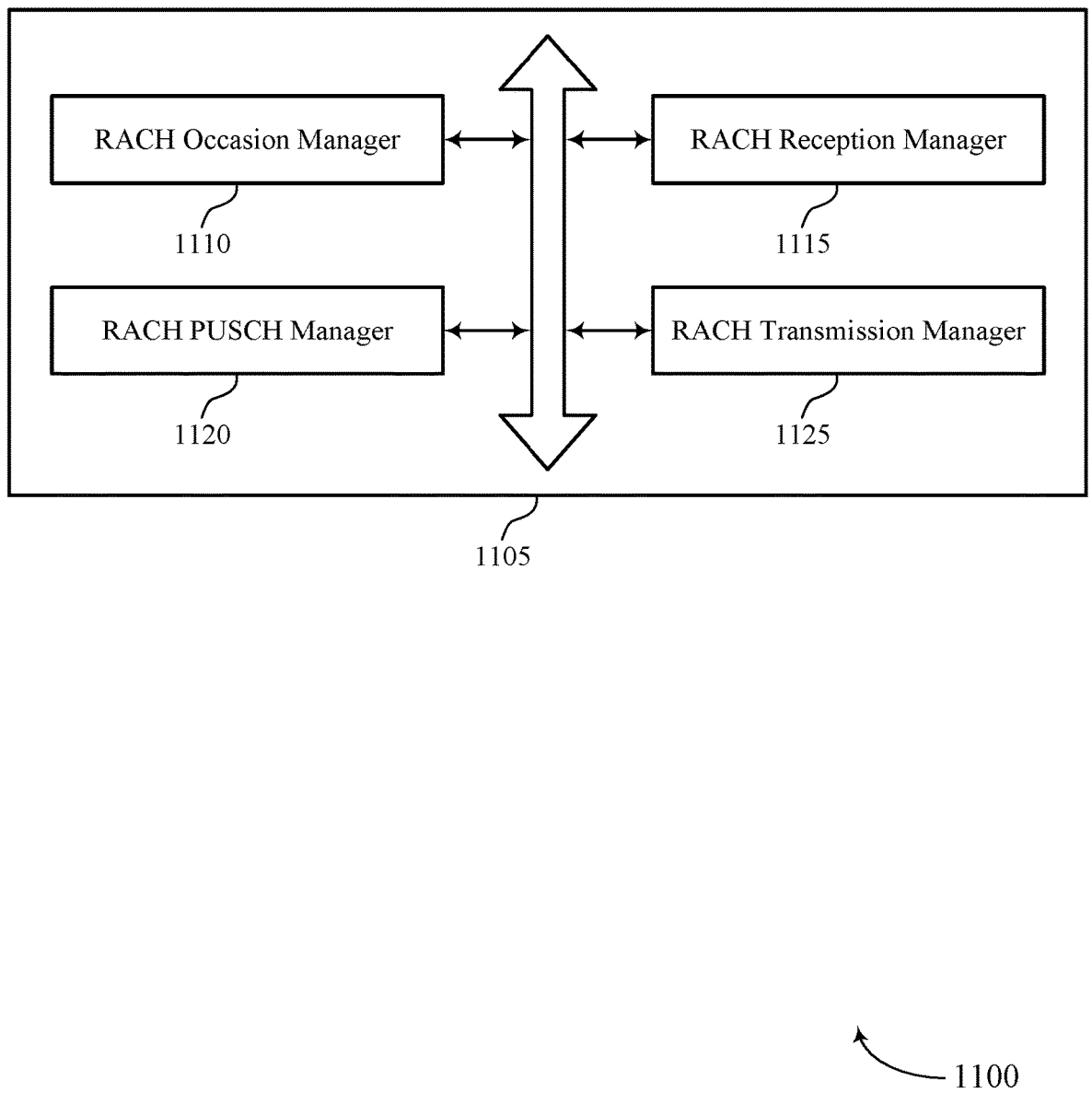
FIG. 11 shows a block diagram of a communications manager that supports RACH occasion configuration in accordance with aspects of the present disclosure.

FIG. 11 shows a block diagram 1100 of a communications manager 1105 that supports RACH occasion configuration in accordance with aspects of the present disclosure. The communications manager 1105 may be an example of aspects of a communications manager 915, a communications manager 1015, or a communications manager 1210 described herein. The communications manager 1105 may include a RACH occasion manager 1110, a RACH reception manager 1115, a RACH PUSCH manager 1120, and a RACH transmission manager 1125. Each of these modules may communicate, directly or indirectly, with one another (e.g., via one or more buses).

The RACH occasion manager 1110 may identify a configuration for a random-access channel occasion to be allocated to one or more UEs, where the configuration indicates a first set of resources in the random-access channel occasion allocated for a random-access preamble transmission and a second set of resources in the random-access channel occasion allocated for a data or control information transmission. In some examples, the RACH occasion manager 1110 may transmit a control message indicating the configuration of the random-access channel occasion. In some cases, the configuration of the random-access channel occasion further indicates a correspondence of the random-access channel occasion to a synchronization signal block.

In some cases, a size of the second set of resources allocated for the data or control information transmission is based on the data or control information to be transmitted in the random-access channel occasion. In some aspects, a size of the second set of resources allocated for the data or control information transmission is fixed. In some cases, the first set of resources allocated for the random-access preamble transmission is adjacent to the second set of resources allocated for the data or control information transmission.

The RACH reception manager 1115 may receive, from a UE, a random-access preamble on the first set of resources in the random-access channel occasion and data or control information on the second set of resources in the random-access channel occasion as part of a two-step random-access procedure. In some examples, the RACH reception manager 1115 may receive the data or control information in the random-access channel occasion with the random-access preamble based on a number of bytes of the data or control information being below a threshold. In some cases, the threshold may be configurable and may be based at least in part on the random-access channel occasion. In some examples, the RACH reception manager 1115 may receive the random-access preamble and the data or control information in the random-access channel occasion in a first random-access message of the two-step random-access procedure.

The RACH PUSCH manager 1120 may receive additional data or control information in a data channel in the first random-access message but outside of the random-access channel occasion. In some examples, the RACH PUSCH manager 1120 may receive an indication in the random-access channel occasion of whether additional data or control information is transmitted in a data channel in the first random-access message. In some examples, the RACH PUSCH manager 1120 may receive an indication in the random-access channel occasion of resources to monitor for additional data or control information in a data channel in the first random-access message. The RACH transmission manager 1125 may transmit a second random-access message to the UE as part of the two-step random-access procedure, the second random-access message being transmitted based on reception of the first random-access message. In some cases, the second random-access message includes a timing advance indication, power control parameters, an uplink grant, a downlink grant, a cell radio network temporary identifier, information for contention resolution, or a combination thereof.

Figure 12:
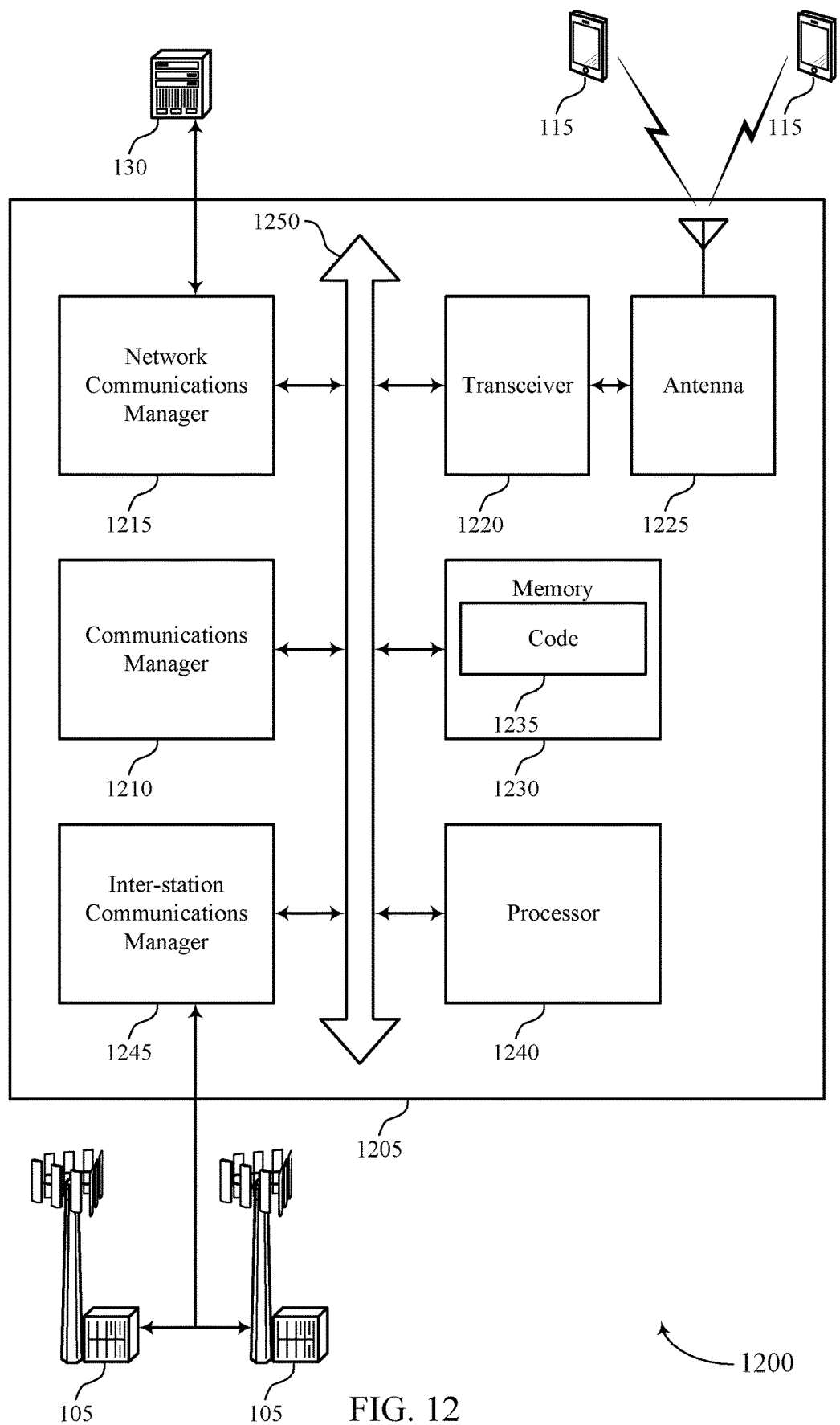
FIG. 12 shows a diagram of a system including a device that supports RACH occasion configuration in accordance with aspects of the present disclosure.

FIG. 12 shows a diagram of a system 1200 including a device 1205 that supports RACH occasion configuration in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may identify a configuration for a random-access channel occasion to be allocated to one or more UEs, where the configuration indicates a first set of resources in the random-access channel occasion allocated for a random-access preamble transmission and a second set of resources in the random-access channel occasion allocated for a data or control information transmission. The communications manager 1210 may transmit a control message indicating the configuration of the random-access channel occasion, and may receive, from a UE, a random-access preamble on the first set of resources in the random-access channel occasion and data or control information on the second set of resources in the random-access channel occasion as part of a two-step random-access procedure.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting RACH occasion configuration).

The inter-station communications manager 1245 may manage communications with other base station 105 and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
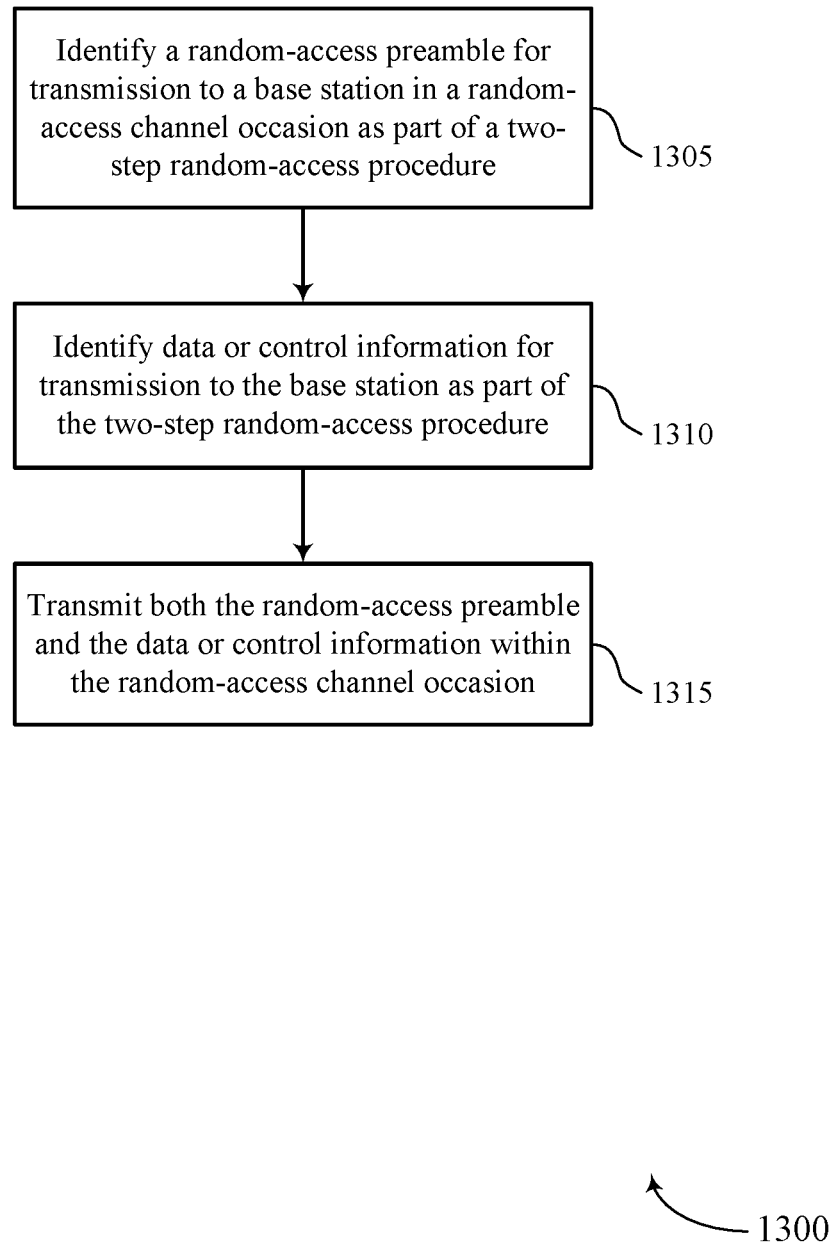
FIGS. 13 and 14 show flowcharts illustrating methods that support RACH occasion configuration in accordance with aspects of the present disclosure.

FIG. 13 shows a flowchart illustrating a method 1300 that supports RACH occasion configuration in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally, or alternatively, a UE may perform aspects of the functions described below using special-purpose hardware.

At 1305, the UE may identify a random-access preamble for transmission to a base station in a random-access channel occasion as part of a two-step random-access procedure. The operations of 1305 may be performed according to the methods described herein. In some examples, aspects of the operations of 1305 may be performed by a RACH preamble manager as described with reference to FIGS. 5 through 8.

At 1310, the UE may identify data or control information for transmission to the base station as part of the two-step random-access procedure. The operations of 1310 may be performed according to the methods described herein. In some examples, aspects of the operations of 1310 may be performed by a RACH data or control information manager as described with reference to FIGS. 5 through 8.

At 1315, the UE may transmit both the random-access preamble and the data or control information within the random-access channel occasion. The operations of 1315 may be performed according to the methods described herein. In some examples, aspects of the operations of 1315 may be performed by a RACH transmission manager as described with reference to FIGS. 5 through 8.

Figure 14:
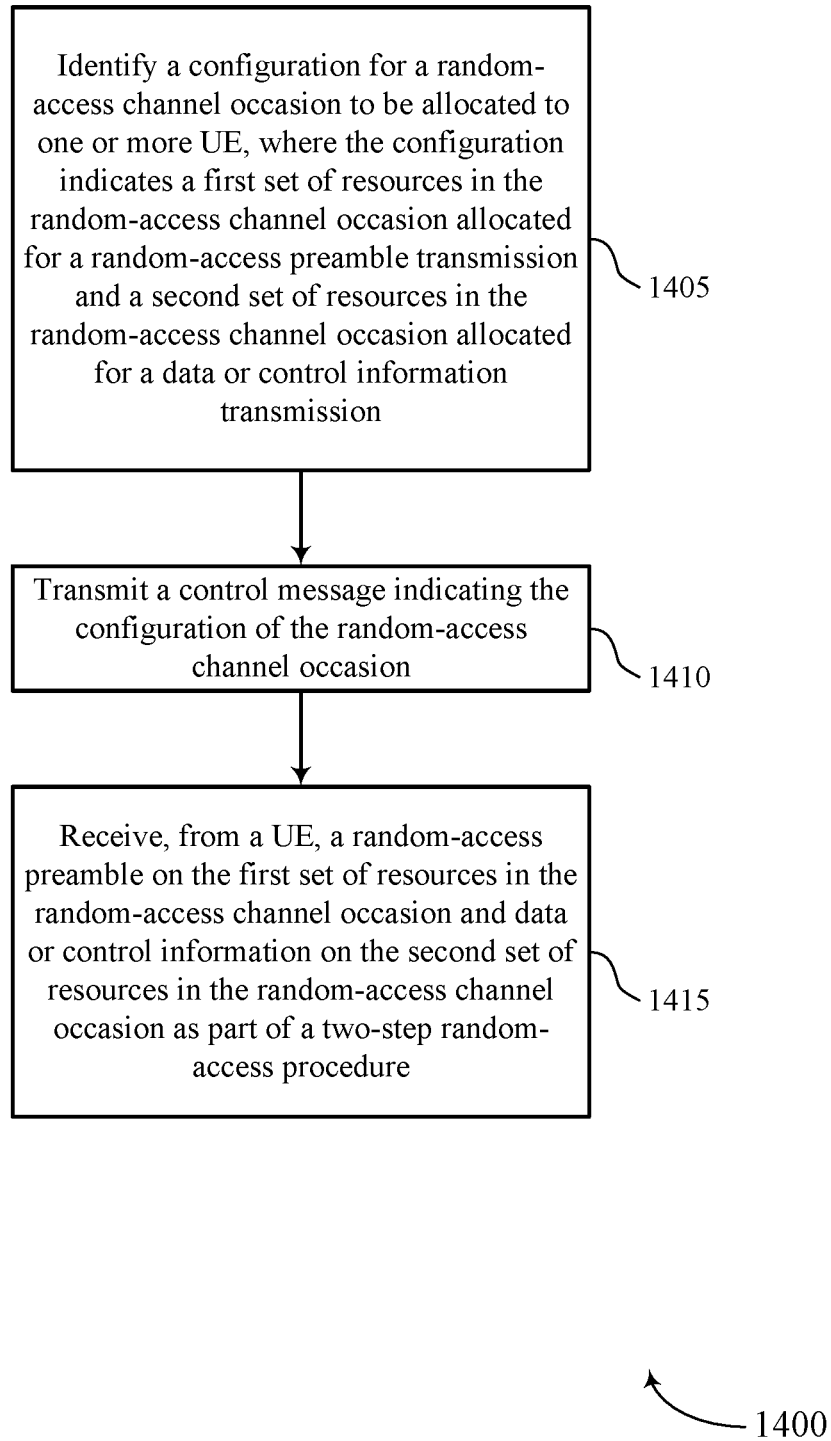

FIG. 14 shows a flowchart illustrating a method 1400 that supports RACH occasion configuration in accordance with aspects of the present disclosure. The operations of method 1400 may be implemented by a base station 105 or its components as described herein. For example, the operations of method 1400 may be performed by a communications manager as described with reference to FIGS. 9 through 12. In some examples, a base station may execute a set of instructions to control the functional elements of the base station to perform the functions described below. Additionally, or alternatively, a base station may perform aspects of the functions described below using special-purpose hardware.

At 1405, the base station may identify a configuration for a random-access channel occasion to be allocated to one or more UE, where the configuration indicates a first set of resources in the random-access channel occasion allocated for a random-access preamble transmission and a second set of resources in the random-access channel occasion allocated for a data or control information transmission. The operations of 1405 may be performed according to the methods described herein. In some examples, aspects of the operations of 1405 may be performed by a RACH occasion manager as described with reference to FIGS. 9 through 12.

At 1410, the base station may transmit a control message indicating the configuration of the random-access channel occasion. The operations of 1410 may be performed according to the methods described herein. In some examples, aspects of the operations of 1410 may be performed by a RACH occasion manager as described with reference to FIGS. 9 through 12.

At 1415, the base station may receive, from a UE, a random-access preamble on the first set of resources in the random-access channel occasion and data or control information on the second set of resources in the random-access channel occasion as part of a two-step random-access procedure. The operations of 1415 may be performed according to the methods described herein. In some examples, aspects of the operations of 1415 may be performed by a RACH reception manager as described with reference to FIGS. 9 through 12.

Described below are a number of embodiments of methods, systems or apparatuses including means for implementing methods or realizing apparatuses, non-transitory computer-readable medium storing instructions executable by one or more processors to cause the one or more processors to implement methods, and systems including one or more processors and memory coupled with the one or more processors storing instructions executable by the one or more processors to cause the system or apparatus to implement methods. It is to be understood that these are just some examples of possible embodiments, and other examples will be readily apparent to those skilled in the art without departing from the scope of the disclosure.

Example 1: A method for wireless communication at a user equipment (UE), comprising: identifying a random-access preamble for transmission to a base station in a random-access channel occasion as part of a two-step random-access procedure; identifying data or control information for transmission to the base station as part of the two-step random-access procedure; and transmitting both the random-access preamble and the data or control information within the random-access channel occasion.

Example 2: The method of claim 1, wherein transmitting both the random-access preamble and the data or control information within the random-access channel occasion comprises: transmitting the data or control information in the random-access channel occasion with the random-access preamble based at least in part on a number of bytes of the data or control information being below a threshold.

Example 3: The method of claim 2, wherein the threshold is configurable and is based at least in part on the random-access channel occasion.

Example 4: The method of any of examples 1 to 3, wherein identifying the random-access preamble for transmission to the base station in the random-access channel occasion comprises: receiving a control message indicating a plurality of random-access channel occasion configurations; and selecting the random-access channel occasion from the plurality of random-access channel occasion configurations based at least in part on a content or quantity of the data or control information to be transmitted as part of the two-step random-access procedure.

Example 5: The method of claim 4, wherein each random-access channel occasion configuration indicates time and frequency resources for a random-access preamble transmission in a corresponding random-access channel occasion, a correspondence of the corresponding random-access channel occasion to a synchronization signal block, and a resource size for a data or control information transmission in the corresponding random-access channel occasion.

Example 6: The method of claim 5, wherein the resource size for the data or control information transmission in each random-access channel occasion is based at least in part on data or control information to be transmitted in the random-access channel occasion.

Example 7: The method of claim 5, wherein the resource size for the data or control information transmission in each random-access channel occasion is fixed.

Example 8: The method of any of examples 1 to 7, wherein transmitting both the random-access preamble and the data or control information within the random-access channel occasion comprises: transmitting the random-access preamble and the data or control information in the random-access channel occasion in a first random-access message of the two-step random-access procedure.

Example 9: The method of claim 8, further comprising: transmitting additional data or control information in a data channel in the first random-access message but outside of the random-access channel occasion.

Example 10: The method of claim 8, further comprising: transmitting an indication in the random-access channel occasion of whether additional data or control information is transmitted in a data channel in the first random-access message.

Example 11: The method of claim 8, further comprising: transmitting an indication in the random-access channel occasion of resources to be used for transmitting additional data or control information in a data channel in the first random-access message.

Example 12: The method of claim 8, further comprising: receiving a second random-access message from the base station as part of the two-step random-access procedure, the second random-access message being received based at least in part on transmission of the first random-access message.

Example 13: The method of claim 12, wherein the second random-access message comprises a timing advance indication, power control parameters, an uplink grant, a downlink grant, a cell radio network temporary identifier, information for contention resolution, or a combination thereof.

Example 14: The method of any of examples 1 to 13, wherein the data or control information is transmitted on a first set of resources adjacent to a second set of resources on which the random-access preamble is transmitted in the random-access channel occasion.

Example 15: An apparatus for wireless communications comprising a processor; memory coupled with the processor; and instructions stored in the memory and executable by the processor to cause the apparatus to perform a method of any of examples 1 to 14.

Example 16: An apparatus comprising at least one means for performing a method of any of examples 1 to 14.

Example 17: A non-transitory computer-readable medium storing code for wireless communications, the code comprising instructions executable by a processor to perform a method of any of examples 1 to 14.

Example 18: A method for wireless communication at a base station, comprising: identifying a configuration for a random-access channel occasion to be allocated to one or more user equipment (UE), wherein the configuration indicates a first set of resources in the random-access channel occasion allocated for a random-access preamble transmission and a second set of resources in the random-access channel occasion allocated for a data or control information transmission; transmitting a control message indicating the configuration of the random-access channel occasion; and receiving, from a user equipment (UE), a random-access preamble on the first set of resources in the random-access channel occasion and data or control information on the second set of resources in the random-access channel occasion as part of a two-step random-access procedure.

Example 19: The method of claim 18, wherein receiving the random-access preamble and the data or control information in the random-access channel occasion comprises: receiving the data or control information in the random-access channel occasion with the random-access preamble based at least in part on a number of bytes of the data or control information being below a threshold.

Example 20: The method of claim 19, wherein the threshold is configurable and is based at least in part on the random-access channel occasion.

Example 21: The method of any of examples 18 to 20, wherein the configuration of the random-access channel occasion further indicates a correspondence of the random-access channel occasion to a synchronization signal block.

Example 22: The method of any of examples 18 to 21, wherein a size of the second set of resources allocated for the data or control information transmission is based at least in part on the data or control information to be transmitted in the random-access channel occasion.

Example 23: The method of any of examples 18 to 22, wherein a size of the second set of resources allocated for the data or control information transmission is fixed.

Example 24: The method of any of examples 18 to 23, wherein receiving the random-access preamble and the data or control information in the random-access channel occasion comprises: receiving the random-access preamble and the data or control information in the random-access channel occasion in a first random-access message of the two-step random-access procedure.

Example 25: The method of claim 24, further comprising: receiving additional data or control information in a data channel in the first random-access message but outside of the random-access channel occasion.

Example 26: The method of claim 24, further comprising: receiving an indication in the random-access channel occasion of whether additional data or control information is transmitted in a data channel in the first random-access message.

Example 27: The method of claim 24, further comprising: receiving an indication in the random-access channel occasion of resources to monitor for additional data or control information in a data channel in the first random-access message.

Example 28: The method of claim 24, further comprising: transmitting a second random-access message to the UE as part of the two-step random-access procedure, the second random-access message being transmitted based at least in part on reception of the first random-access message.

Example 29: The method of claim 28, wherein the second random-access message comprises a timing advance indication, power control parameters, an uplink grant, a downlink grant, a cell radio network temporary identifier, information for contention resolution, or a combination thereof.

Example 30: The method of any of examples 18 to 29, wherein the first set of resources allocated for the random-access preamble transmission is adjacent to the second set of resources allocated for the data or control information transmission.

Example 31: An apparatus for wireless communications comprising a processor; memory coupled with the processor; and instructions stored in the memory and executable by the processor to cause the apparatus to perform a method of any of examples 18 to 30.

Example 32: An apparatus comprising at least one means for performing a method of any of examples 18 to 30.

Example 33: A non-transitory computer-readable medium storing code for wireless communications, the code comprising instructions executable by a processor to perform a method of any of examples 18 to 30.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   identifying a random-access preamble for transmission to a base station in a random-access channel occasion as part of a two-step random-access procedure, the random-access channel occasion comprising a set of time and frequency resources allocated for transmitting the random-access preamble, wherein the random-access channel occasion is selected from a plurality of random-access channel occasions based at least in part on an intention of the two-step random-access procedure;

identifying data or control information for transmission to the base station as part of the two-step random-access procedure; and transmitting, via a first random-access message of the two-step random-access procedure, both the random-access preamble and the data or control information within the random-access channel occasion of the first random-access message, wherein the data or control information included within the random-access channel occasion is based at least in part on the intention of the two-step random-access procedure.

2. The method of claim 1, wherein transmitting both the random- access preamble and the data or control information within the random-access channel occasion comprises:

transmitting the data or control information in the random-access channel occasion with the random-access preamble based at least in part on a number of bytes of the data or control information being below a threshold.

3. The method of claim 2, wherein the threshold is configurable and is based at least in part on the random-access channel occasion.

4. The method of claim 1, wherein identifying the random-access preamble for transmission to the base station in the random-access channel occasion comprises:

receiving a control message indicating a plurality of random-access channel occasion configurations; and selecting the random-access channel occasion from the plurality of random-access channel occasion configurations based at least in part on a content or quantity of the data or control information to be transmitted as part of the two-step random-access procedure.

5. The method of claim 4, wherein each random-access channel occasion configuration indicates time and frequency resources for a random-access preamble transmission in a corresponding random-access channel occasion, a correspondence of the corresponding random-access channel occasion to a synchronization signal block, and a resource size for a data or control information transmission in the corresponding random-access channel occasion.

6. The method of claim 5, wherein the resource size for the data or control information transmission in each random-access channel occasion is based at least in part on data or control information to be transmitted in the random-access channel occasion, or wherein the resource size for the data or control information transmission in each random-access channel occasion is fixed.

7. The method of claim 1, wherein the intention of the two-step random-access procedure comprises an intention to gain initial access, an intention to re-establish an RRC connection, an intention to transition from a radio resource control (RRC) inactive mode to an RRC active mode, or an intention to request system information, wherein the data or control information comprises an RRC setup request, an RRC reestablishment request, an RRC resume request, or an RRC system information request.

8. The method of claim 1, further comprising:

transmitting additional data or control information in a data channel in the first random-access message but outside of the random-access channel occasion.

9. The method of claim 1, further comprising:

transmitting an indication in the random-access channel occasion of whether additional data or control information is transmitted in a data channel in the first random-access message.

10. The method of claim 1, further comprising:

transmitting an indication in the random-access channel occasion of resources to be used for transmitting additional data or control information in a data channel in the first random-access message.

11. The method of claim 1, further comprising:

receiving a second random-access message from the base station as part of the two-step random-access procedure, the second random-access message being received based at least in part on transmission of the first random-access message.

12. The method of claim 11, wherein the second random-access message comprises a timing advance indication, power control parameters, an uplink grant, a downlink grant, a cell radio network temporary identifier, information for contention resolution, or a combination thereof.

13. The method of claim 1, wherein the data or control information is transmitted on a first set of resources adjacent to a second set of resources on which the random-access preamble is transmitted in the random-access channel occasion.

14. An apparatus for wireless communication at a user equipment (UE), comprising:

one or more processors;

one or more memories coupled with the one or more processors; and instructions stored in the one or more memories and executable by the one or more processors to cause the apparatus to:

identify a random-access preamble for transmission to a base station in a random-access channel occasion as part of a two-step random-access procedure, the random-access channel occasion comprising a set of time and frequency resources allocated for transmitting the random-access preamble, wherein the random-access channel occasion is selected from a plurality of random-access channel occasions based at least in part on an intention of the two-step random-access procedure;

identify data or control information for transmission to the base station as part of the two-step random-access procedure; and transmit, via a first random-access message of the two-step random-access procedure, both the random-access preamble and the data or control information within the random-access channel occasion of the first random-access message, wherein the data or control information included within the random-access channel occasion is based at least in part on the intention of the two-step random-access procedure.

15. The apparatus of claim 14, wherein the instructions to transmit both the random-access preamble and the data or control information within the random-access channel occasion are executable by the one or more processors to cause the apparatus to:

transmit the data or control information in the random-access channel occasion with the random-access preamble based at least in part on a number of bytes of the data or control information being below a threshold.

16. The apparatus of claim 15, wherein the threshold is configurable and is based at least in part on the random-access channel occasion.

17. The apparatus of claim 14, wherein the instructions to identify the random-access preamble for transmission to the base station in the random-access channel occasion are executable by the one or more processors to cause the apparatus to:

receive a control message indicating a plurality of random-access channel occasion configurations; and
select the random-access channel occasion from the plurality of random-access channel occasion configurations based at least in part on a content or quantity of the data or control information to be transmitted as part of the two-step random-access procedure.

18. The apparatus of claim 17, wherein each random-access channel occasion configuration indicates time and frequency resources for a random-access preamble transmission in a corresponding random-access channel occasion, a correspondence of the corresponding random-access channel occasion to a synchronization signal block, and a resource size for a data or control information transmission in the corresponding random-access channel occasion.

19. The apparatus of claim 18, wherein the resource size for the data or control information transmission in each random-access channel occasion is based at least in part on data or control information to be transmitted in the random-access channel occasion.

20. The apparatus of claim 18, wherein the resource size for the data or control information transmission in each random-access channel occasion is fixed.

21. The apparatus of claim 14, wherein the instructions are further executable by the one or more processors to cause the apparatus to:
transmit additional data or control information in a data channel in the first random-access message but outside of the random-access channel occasion.

22. The apparatus of claim 14, wherein the instructions are further executable by the one or more processors to cause the apparatus to:
transmit an indication in the random-access channel occasion of whether additional data or control information is transmitted in a data channel in the first random-access message.

23. The apparatus of claim 14, wherein the instructions are further executable by the one or more processors to cause the apparatus to:
transmit an indication in the random-access channel occasion of resources to be used for transmitting additional data or control information in a data channel in the first random-access message.

24. The apparatus of claim 14, wherein the instructions are further executable by the one or more processors to cause the apparatus to:
receive a second random-access message from the base station as part of the two-step random-access procedure, the second random-access message being received based at least in part on transmission of the first random-access message.

25. The apparatus of claim 24, wherein the second random-access message comprises a timing advance indication, power control parameters, an uplink grant, a downlink grant, a cell radio network temporary identifier, information for contention resolution, or a combination thereof.

26. The apparatus of claim 14, wherein the data or control information is transmitted on a first set of resources adjacent to a second set of resources on which the random-access preamble is transmitted in the random-access channel occasion.

27. An apparatus for wireless communication at a user equipment (UE), comprising:
means for identifying a random-access preamble for transmission to a base station in a random-access channel occasion as part of a two-step random-access procedure, the random-access channel occasion comprising a set of time and frequency resources allocated for transmitting the random-access preamble, wherein the random-access channel occasion is selected from a plurality of random-access channel occasions based at least in part on an intention of the two-step random-access procedure;
means for identifying data or control information for transmission to the base station as part of the two-step random-access procedure; and
means for transmitting, via a first random-access message of the two-step random-access procedure, both the random-access preamble and the data or control information within the random-access channel occasion of the first random-access message, wherein the data or control information included within the random-access channel occasion is based at least in part on the intention of the two-step random-access procedure.

28. A non-transitory computer-readable medium storing code for wireless communication at a user equipment (UE), the code comprising instructions executable by a processor to:
identify a random-access preamble for transmission to a base station in a random-access channel occasion as part of a two-step random-access procedure, the random-access channel occasion comprising a set of time and frequency resources allocated for transmitting the random-access preamble, wherein the random-access channel occasion is selected from a plurality of random-access channel occasions based at least in part on an intention of the two-step random-access procedure;
identify data or control information for transmission to the base station as part of the two-step random-access procedure; and
transmit, via a first random-access message of the two-step random-access procedure, both the random-access preamble and the data or control information within the random-access channel occasion of the first random-access message, wherein the data or control information included within the random-access channel occasion is based at least in part on the intention of the two-step random-access procedure.

* * * * *